(12) United States Patent
Saito

(10) Patent No.: US 11,205,975 B2
(45) Date of Patent: Dec. 21, 2021

(54) PIEZOELECTRIC DRIVE DEVICE, ROBOT AND PRINTER

(71) Applicant: Seiko Epson Corporation, Tokyo (JP)

(72) Inventor: Hidetoshi Saito, Fujimi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 379 days.

(21) Appl. No.: 16/520,422

(22) Filed: Jul. 24, 2019

(65) Prior Publication Data

US 2020/0036302 A1 Jan. 30, 2020

(30) Foreign Application Priority Data

Jul. 25, 2018 (JP) .............................. JP2018-139101

(51) Int. Cl.
*H02N 2/10* (2006.01)
*H02N 2/14* (2006.01)
*B25J 9/12* (2006.01)
*B41J 2/045* (2006.01)

(52) U.S. Cl.
CPC ............. *H02N 2/103* (2013.01); *B25J 9/126* (2013.01); *B41J 2/04541* (2013.01); *B41J 2/04581* (2013.01); *H02N 2/145* (2013.01)

(58) Field of Classification Search
CPC ........ H02N 2/103; H02N 2/145; H02N 2/142; H02N 2/004; H02N 2/10; H02N 2/12; B25J 9/126; B41J 2/04581; B41J 2/04541
See application file for complete search history.

(56) References Cited

U.S. PATENT DOCUMENTS 5,500,578 A 3/1996 Kawamura
2013/0140951 A1* 6/2013 Kamijo ................. H02N 2/103
310/323.16

FOREIGN PATENT DOCUMENTS

JP H05-014511 B2 2/1993
JP 2000-295876 A 10/2000

* cited by examiner

*Primary Examiner* — Emily P Pham
(74) *Attorney, Agent, or Firm* — Gang Yu

(57) ABSTRACT

A piezoelectric drive device for vibrating a vibrating body to make a tip of a protruding part make a rotational motion of drawing an elliptic orbit to thereby drive a driven member, wherein the vibrating body includes a substrate, a driving piezoelectric element configured to vibrate the substrate, and a detecting piezoelectric element configured to detect a vibration of the substrate, the driving piezoelectric element includes a first driving piezoelectric element for making the vibrating body perform a stretching vibration in a first direction, and a second driving piezoelectric element for making the vibrating body perform a flexural vibration in a second direction perpendicular to the first direction, the detecting piezoelectric element is arranged with the first driving piezoelectric element in the first direction, and there is provided a voltage control section for controlling a magnitude of a voltage to be applied to the first driving piezoelectric element.

9 Claims, 16 Drawing Sheets

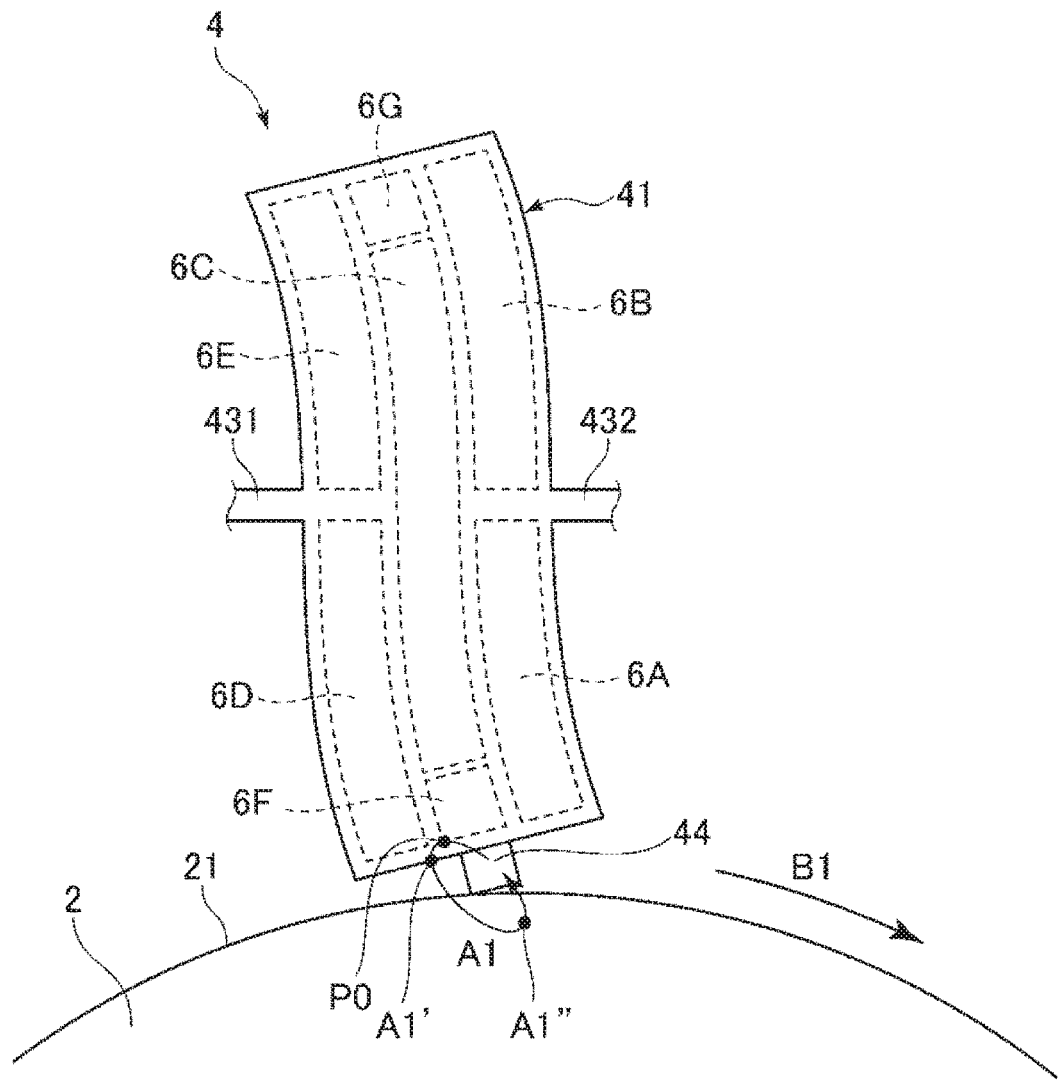
FIG. 8
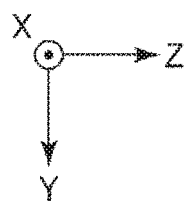

PIEZOELECTRIC DRIVE DEVICE, ROBOT AND PRINTER

The present application is based on, and claims priority from, JP Application Serial Number 2018-139101, filed Jul. 25, 2018, the disclosure of which is hereby incorporated by reference herein in its entirety.

BACKGROUND

1. Technical Field

The present disclosure relates to a piezoelectric drive device, a robot and a printer.

2. Related Art

An ultrasonic actuator described in JP-A-2000-295876 (Document 1) has a resonator, an electricity input device for applying an alternating voltage to the resonator, a variable resistor disposed between the resonator and the electricity input device, a relative motion member moving due to a vibration of the resonator, and a pressurizing member for pressing the resonator against the relative motion member. Further, the resonator is provided with a piezoelectric element having four vibration areas arranged in a 2×2 matrix, and a sliding member having contact with the relative motion member. Further, by applying the alternating voltages having phases shifted π/2 from each other to the two vibration areas located on one diagonal line and the two vibration areas located on the other diagonal line, respectively, from the electricity input device, the sliding member makes an elliptic oscillation, and the relative motion member moves with respect to the resonator in accordance with this elliptic oscillation. Further, in the ultrasonic actuator of Document 1, by varying the resistance value of the variable resistor to vary the amplitude of the alternating voltage to be applied to the piezoelectric element, the shape of the elliptic motion of the sliding member can freely be changed.

However, in the ultrasonic actuator of Document 1, since the resonator is pressed against the relative motion member by the pressurizing member, it is not possible to accurately control the shape of the elliptic motion of the sliding member only by varying the resistance value of the variable resistor.

SUMMARY

A piezoelectric drive device according to an aspect of the present disclosure includes a vibrating body, a protruding part coupled to the vibrating body, and a voltage control section, wherein the piezoelectric drive device vibrates the vibrating body to make a tip of the protruding part make a rotational motion of drawing an elliptic orbit to thereby drive a driven member having contact with the protruding part, the vibrating body includes a substrate, a driving piezoelectric element configured to vibrate the substrate, and a detecting piezoelectric element configured to detect a vibration of the substrate, the driving piezoelectric element includes a first driving piezoelectric element configured to make the vibrating body perform a stretching vibration in a first direction in which the vibrating body and the protruding part are arranged, and a second driving piezoelectric element configured to make the vibrating body perform a flexural vibration in a second direction perpendicular to the first direction in a plan view of the substrate, the detecting piezoelectric element is arranged with the first driving piezoelectric element in the first direction, and the voltage control section controls a magnitude of a voltage to be applied to the first driving piezoelectric element based on a signal output from the detecting piezoelectric element so that a variation in a swing in the first direction of the protruding part becomes smaller compared to a case in which the magnitude of the voltage to be applied to the first driving piezoelectric element is not controlled.

BRIEF DESCRIPTION OF THE DRAWINGS

FIG. 8 is a plan view showing a driving state of a piezoelectric motor shown in FIG. 1.

DESCRIPTION OF EXEMPLARY EMBODIMENTS

Hereinafter, a piezoelectric drive device, a robot and a printer according to the present disclosure will be described in detail based on some embodiments shown in the accompanying drawings.

First Embodiment

Figure 1:
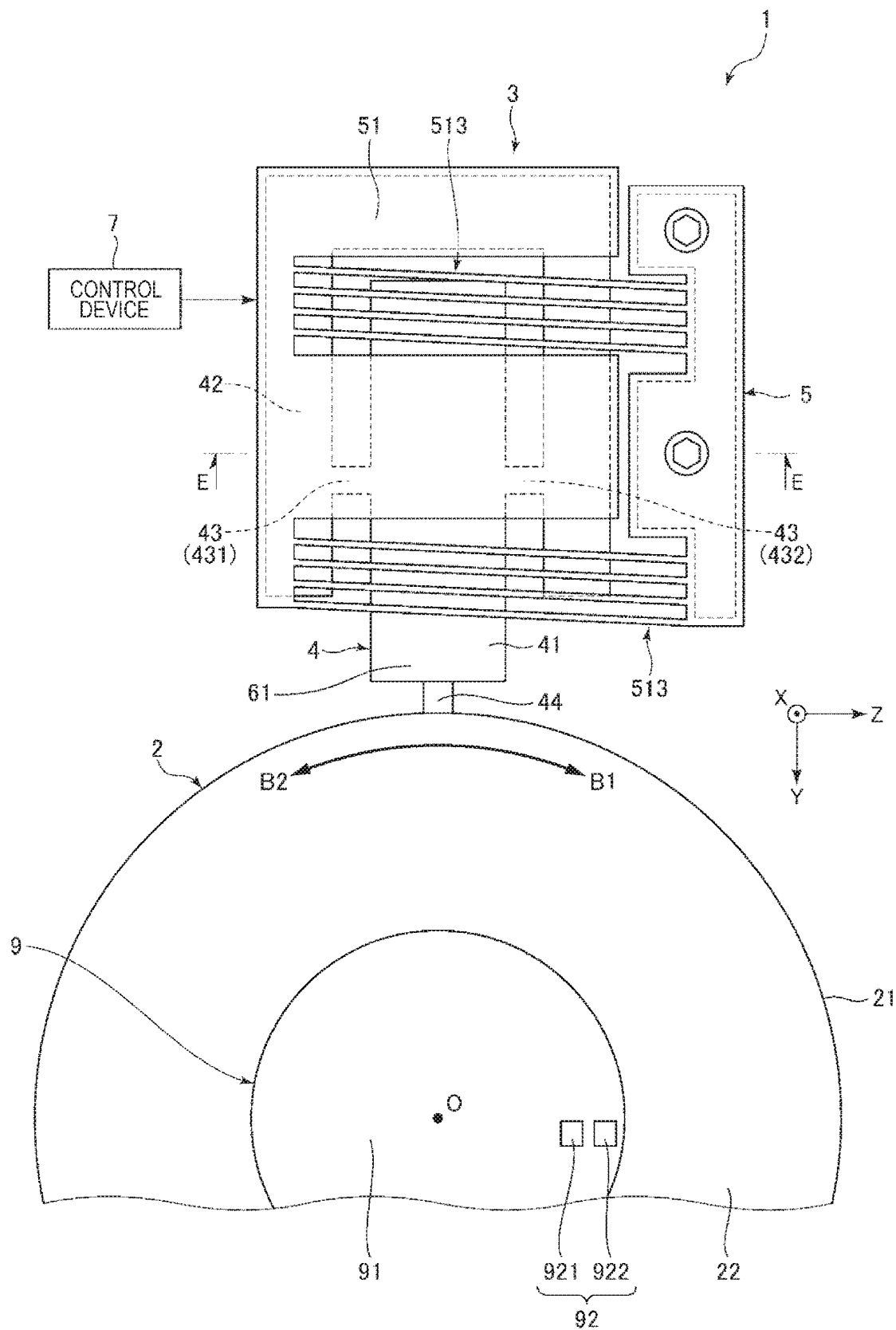
FIG. 1 is a plan view showing a piezoelectric motor according to a first embodiment of the present disclosure.
Figure 2:
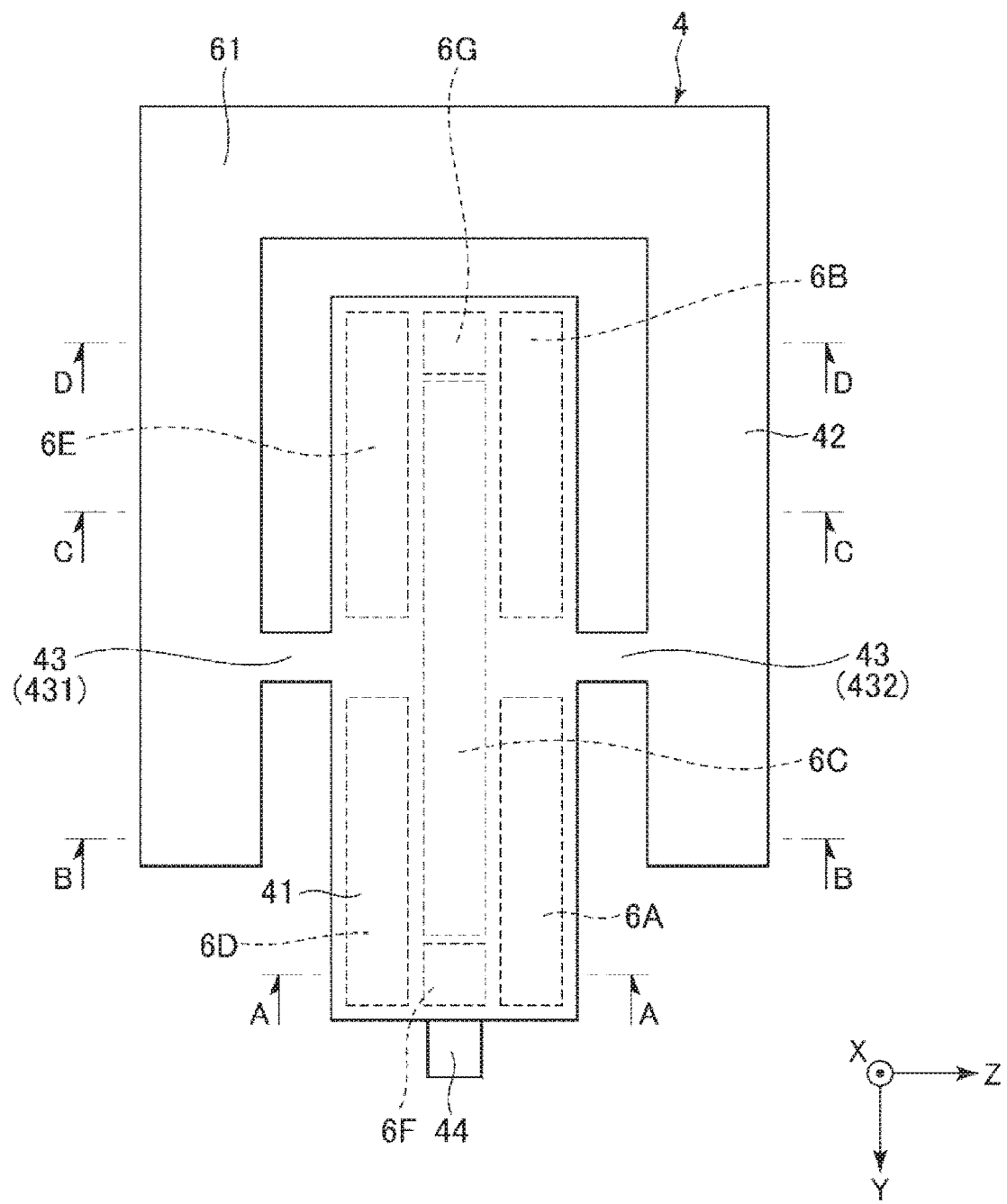
FIG. 2 is a plan view showing a piezoelectric actuator.
Figure 3:
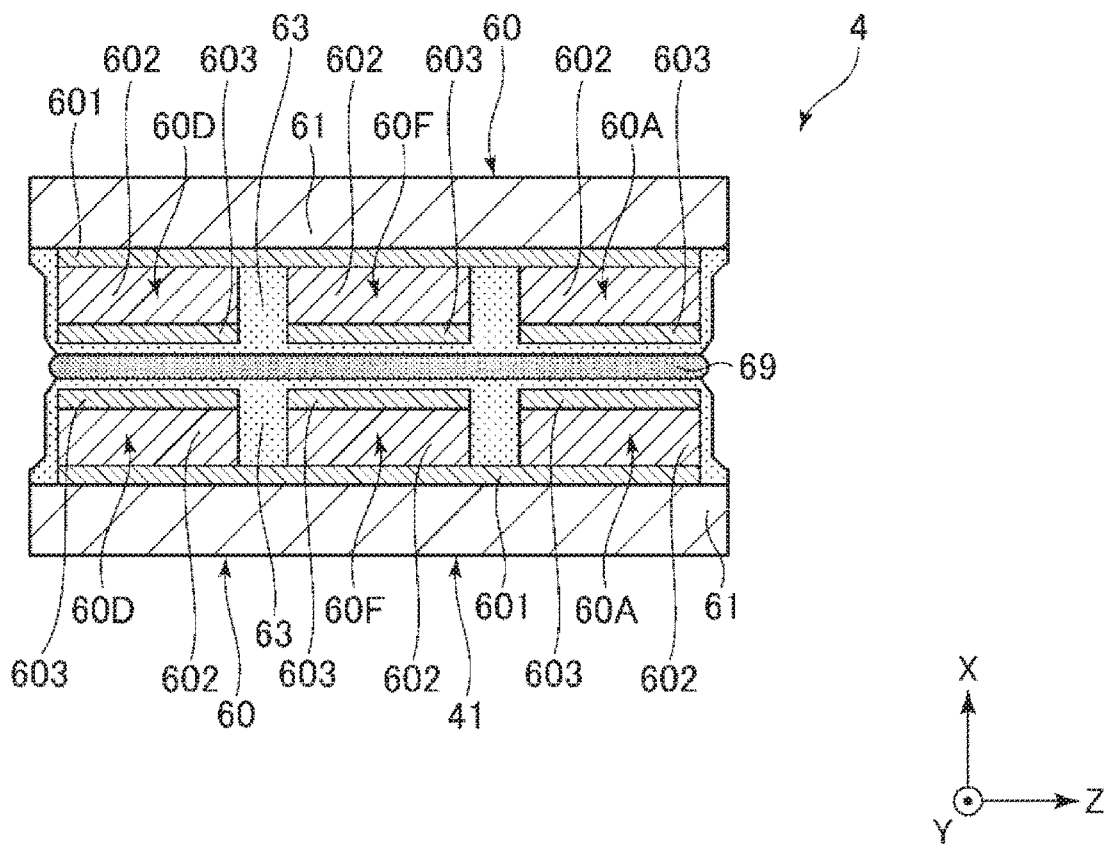
FIG. 3 is a cross-sectional view along the line A-A in FIG. 2.
Figure 4:
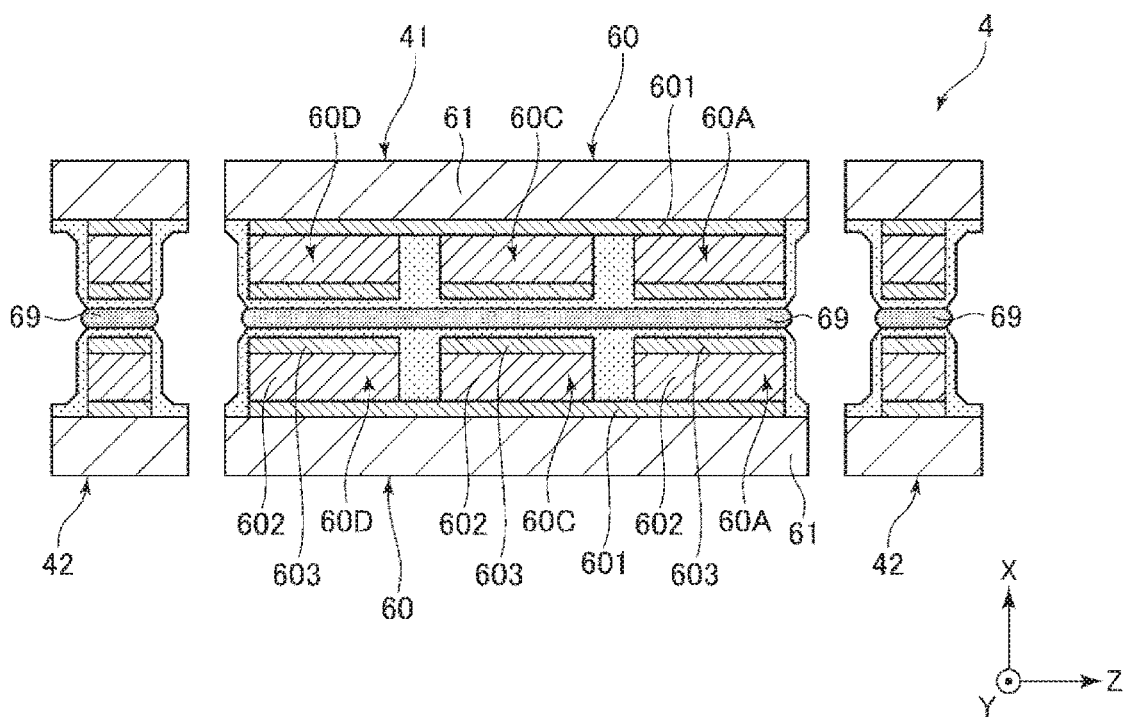
FIG. 4 is a cross-sectional view along the line B-B in FIG. 2.
Figure 5:
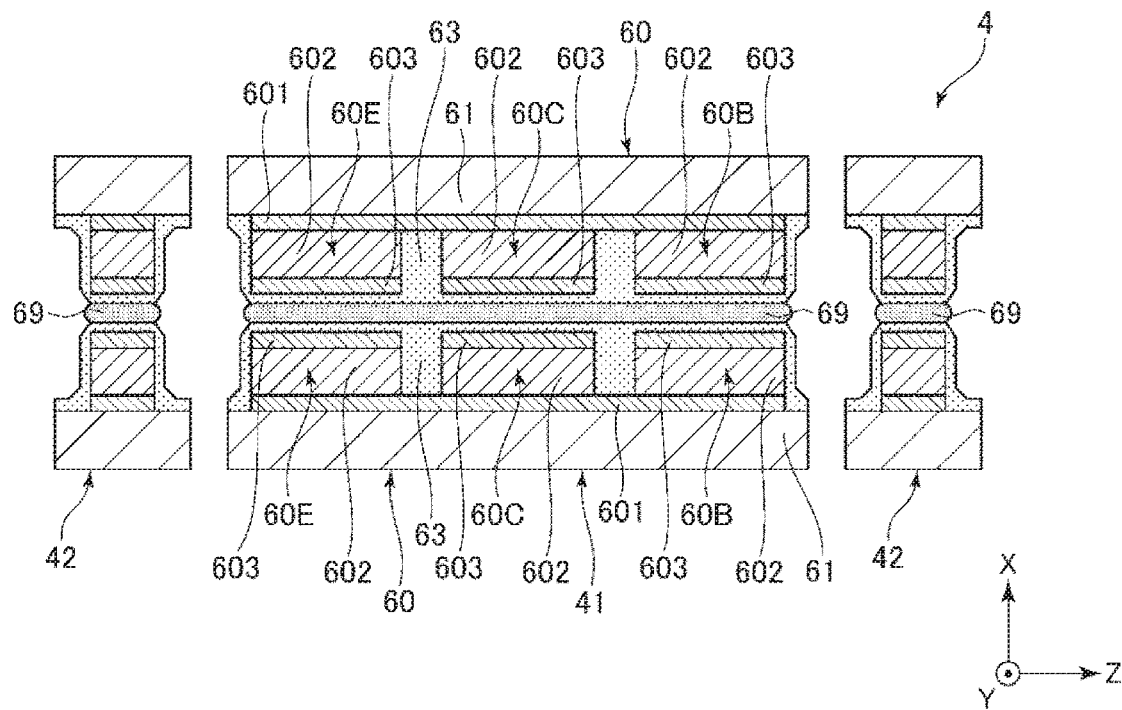
FIG. 5 is a cross-sectional view along the line C-C in FIG. 2.
Figure 6:
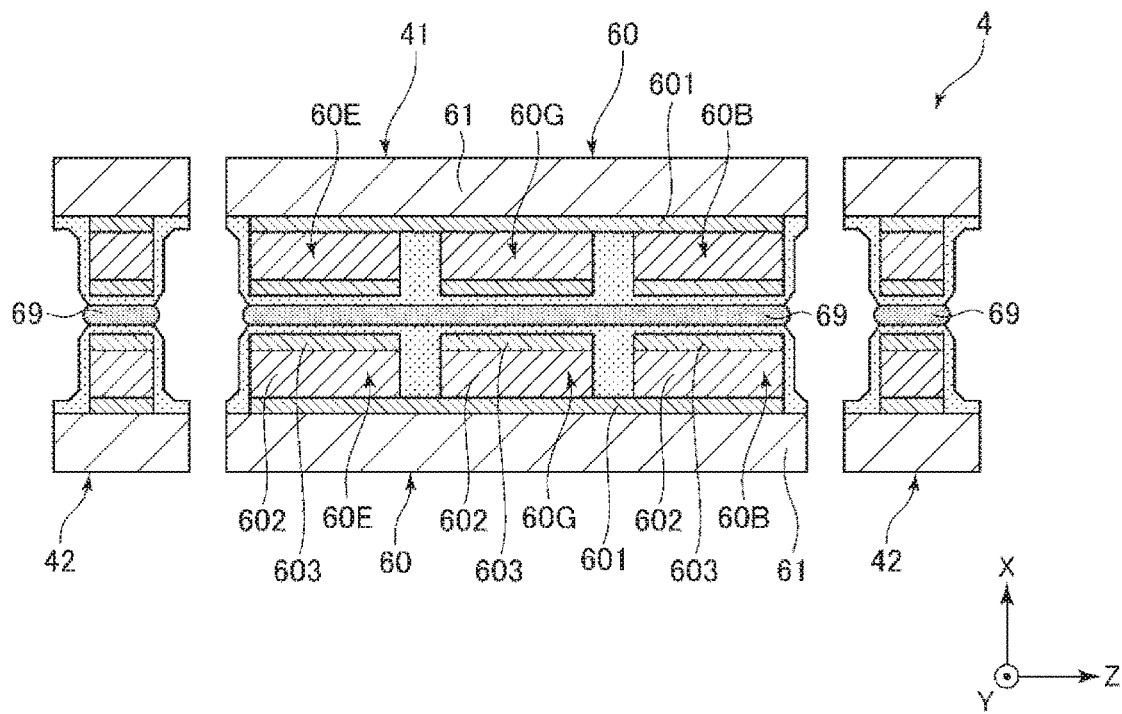
FIG. 6 is a cross-sectional view along the line D-D in FIG. 2.
Figure 7:
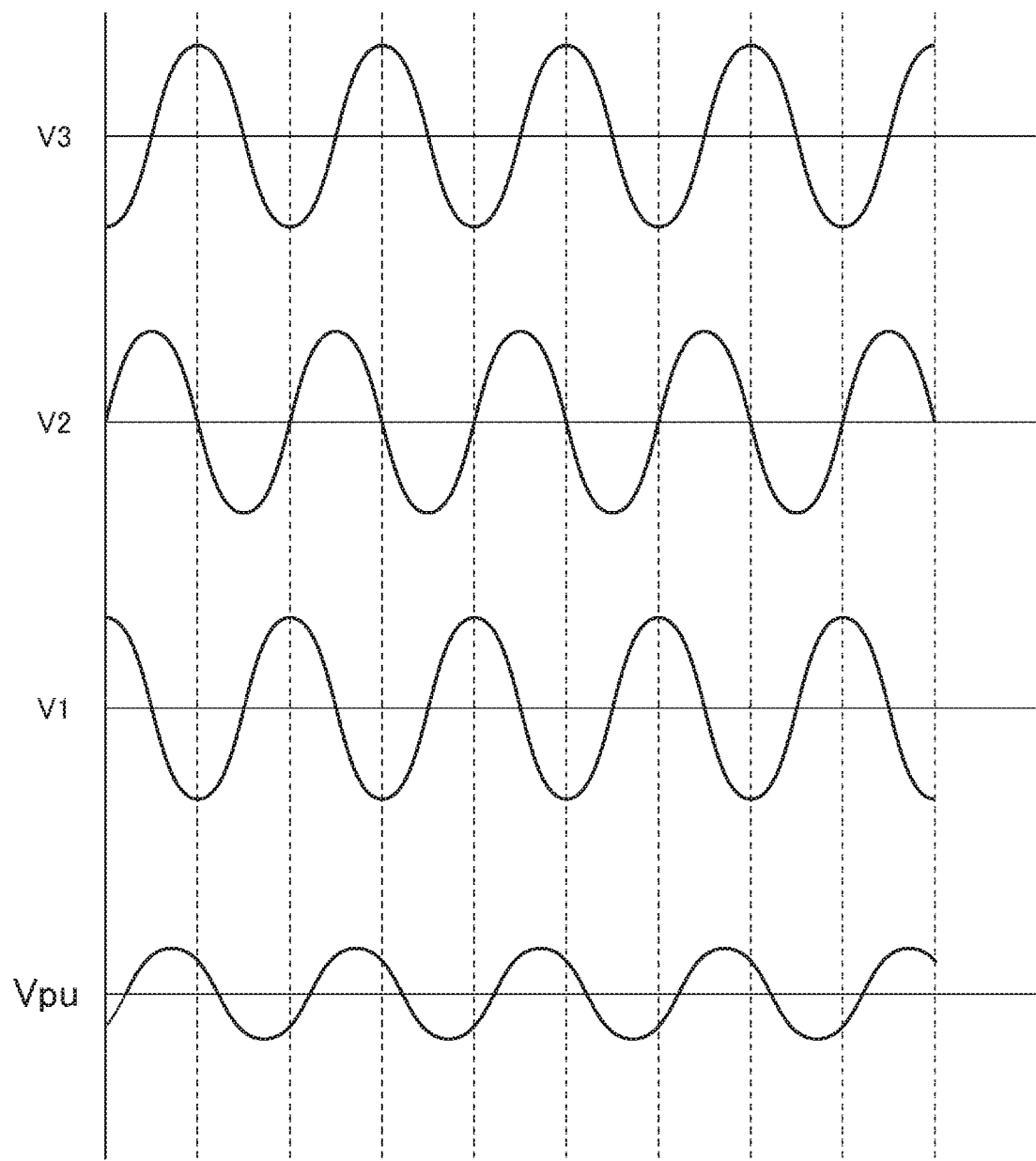
FIG. 7 is a diagram showing an alternating voltage to be applied to the piezoelectric actuator shown in FIG. 2.
Figure 9:
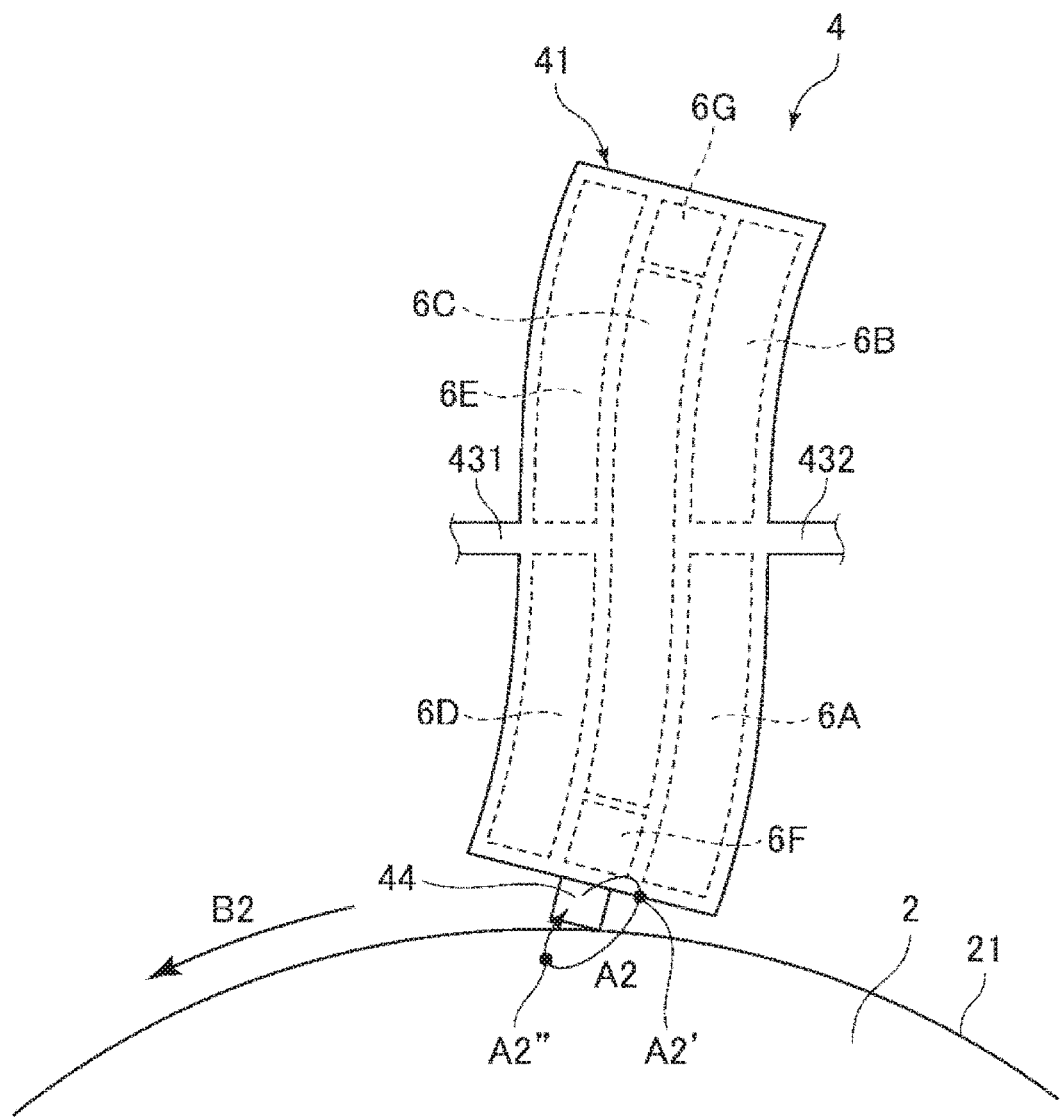
FIG. 9 is a plan view showing the driving state of the piezoelectric motor shown in FIG. 1.
Figure 10:
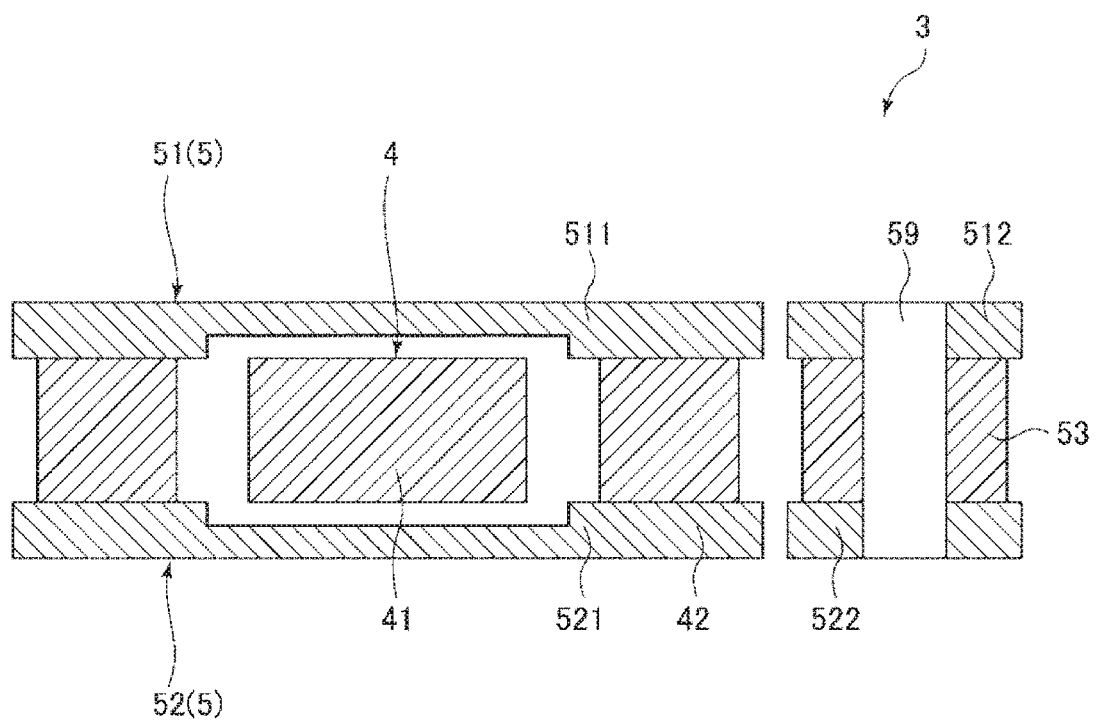
FIG. 10 is a cross-sectional view along the line E-E in FIG. 1.
Figure 11:
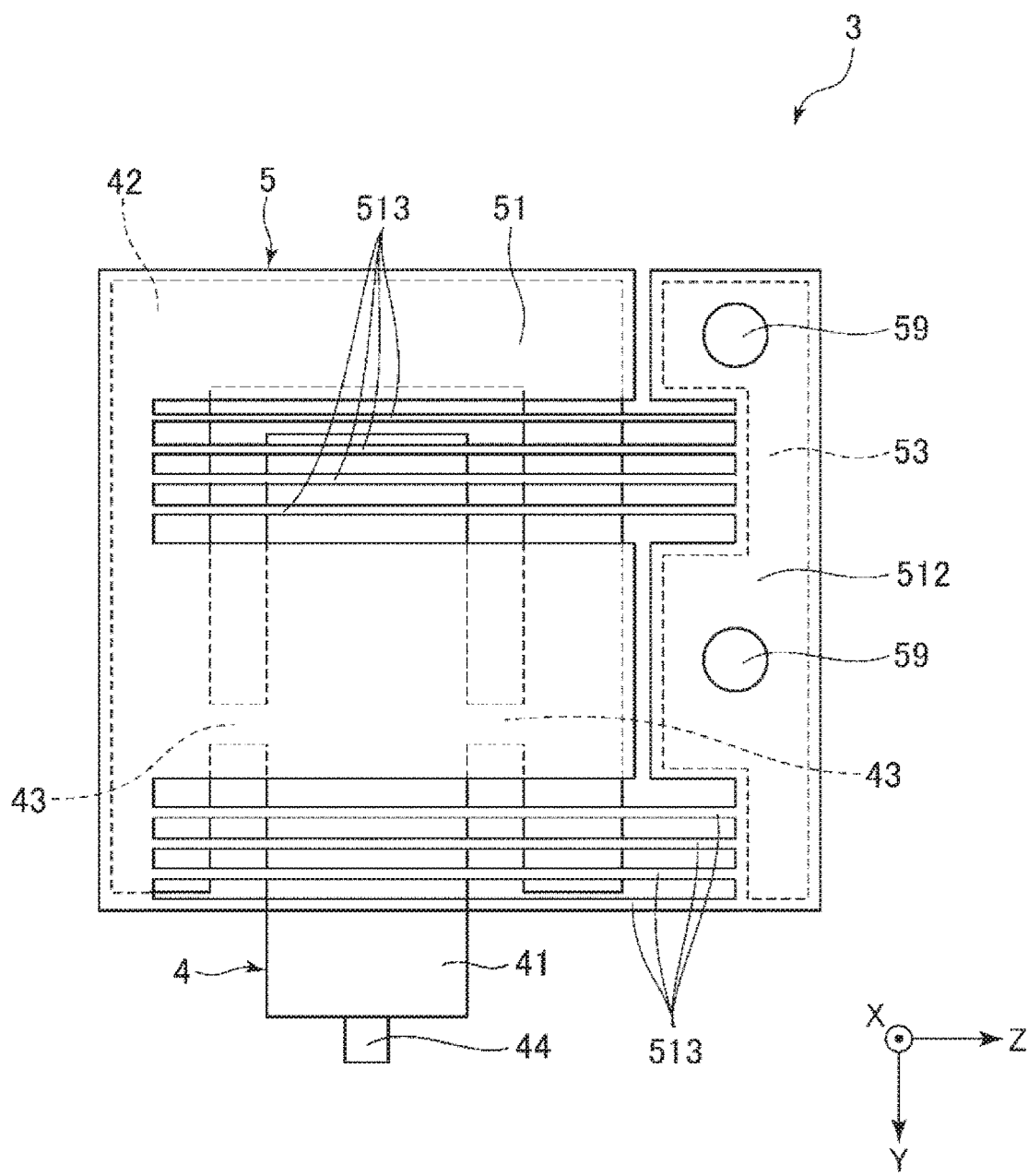
FIG. 11 is a top view showing a biasing member.
Figure 12:
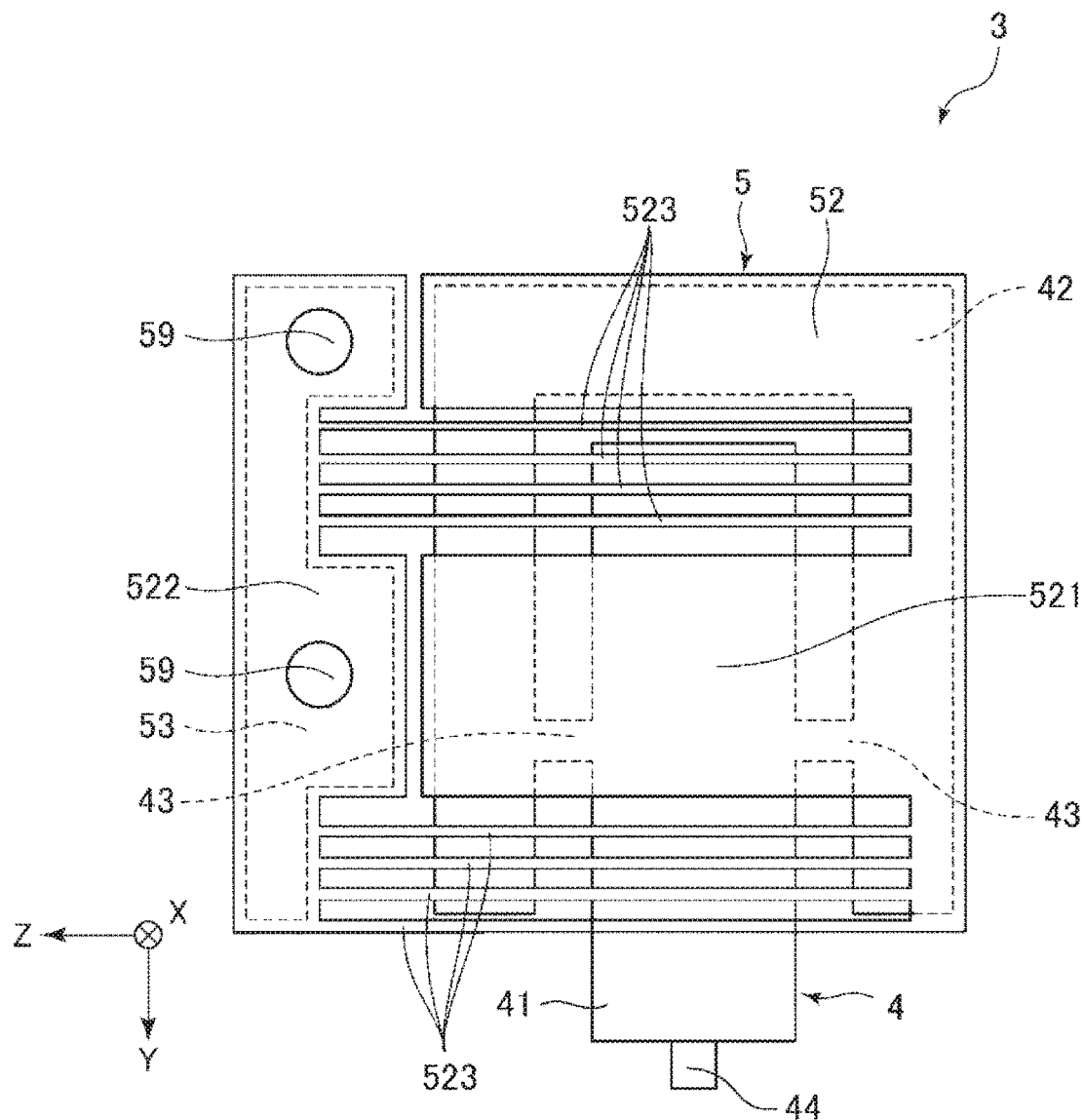
FIG. 12 is a bottom view showing the biasing member.
Figure 13:
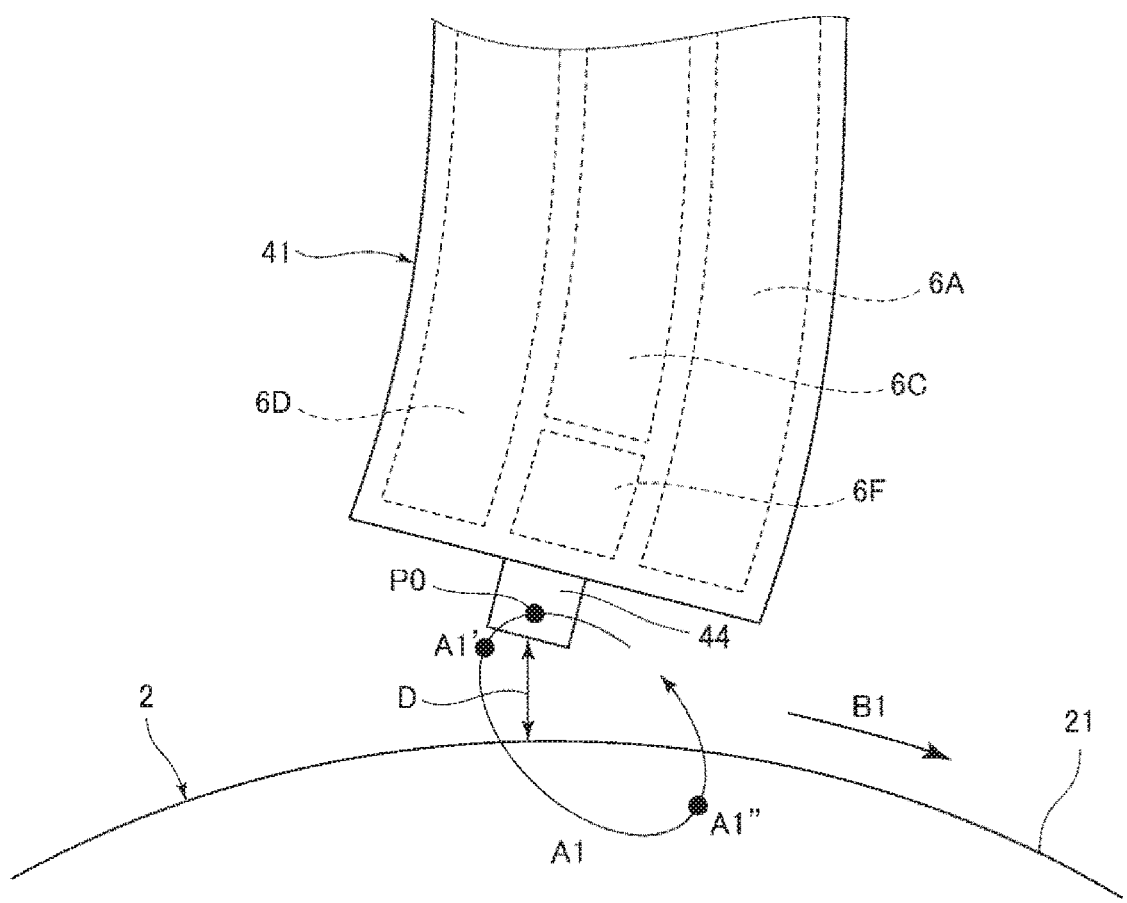
FIG. 13 is a plan view showing a separation state between a rotor and a protruding part.
Figure 14:
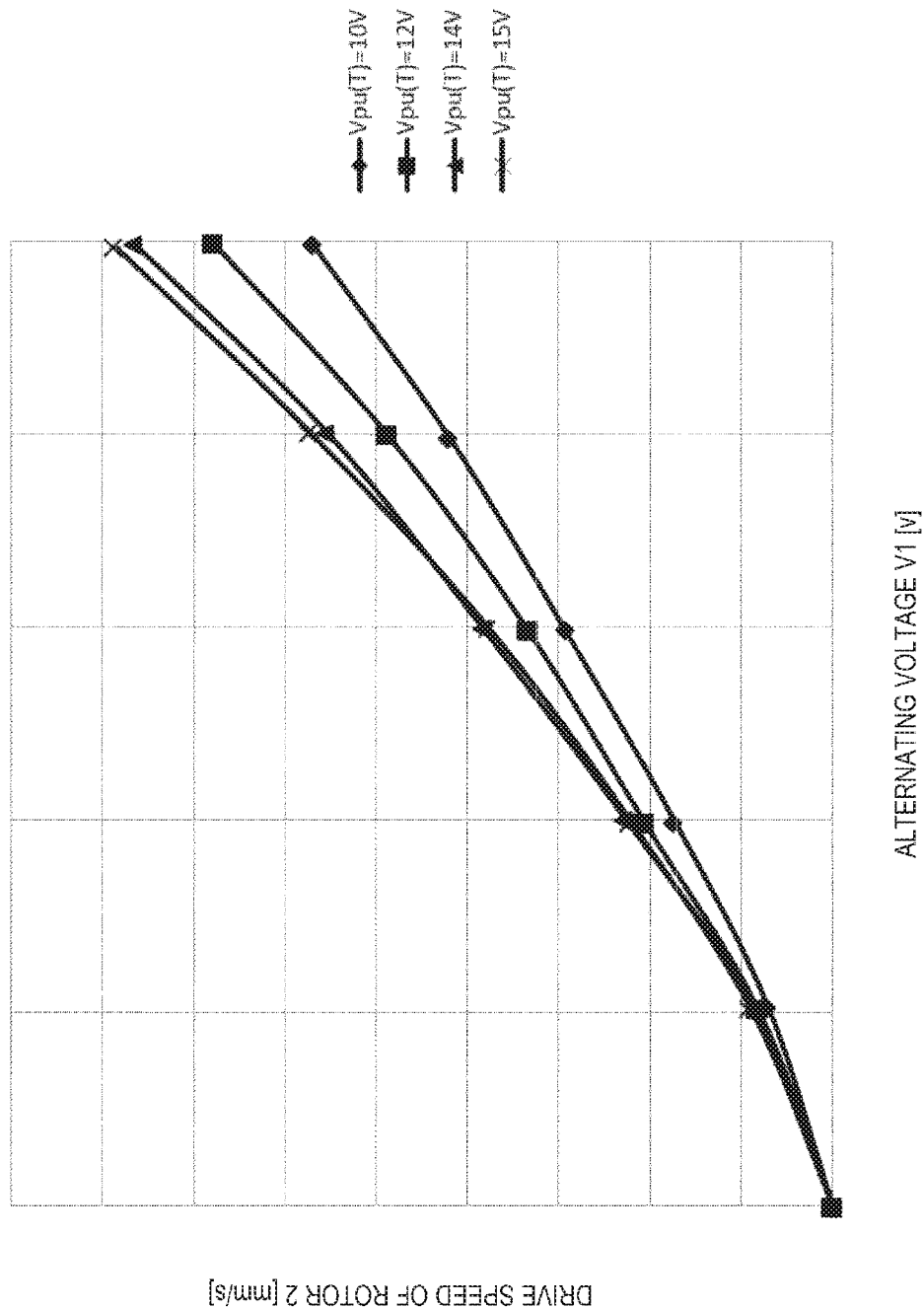
FIG. 14 is a graph showing a relationship between alternating voltages V1, V3 and the driving speed of the rotor.
Figure 15:
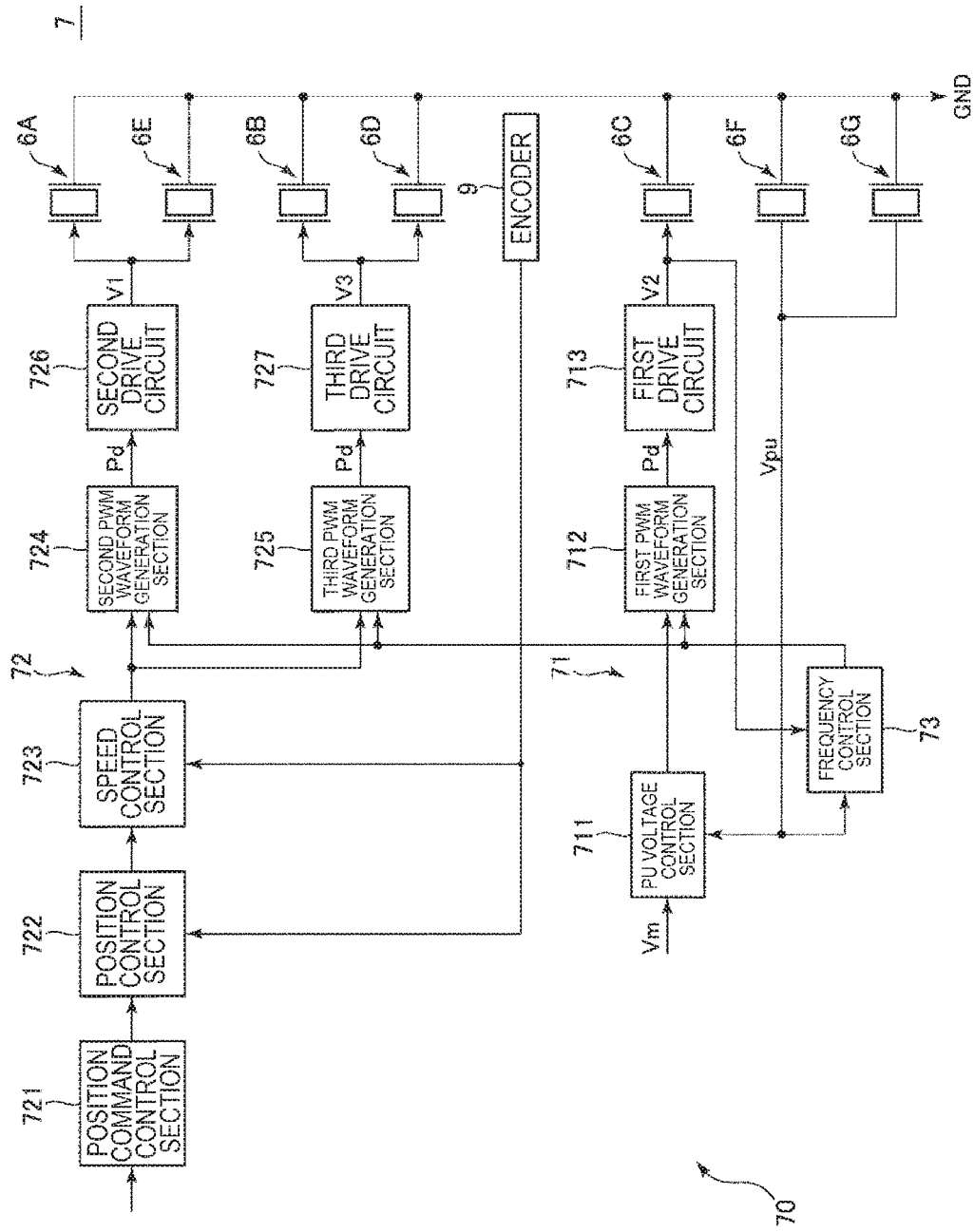
FIG. 15 is a block diagram showing a control device.

FIG. 1 is a plan view showing a piezoelectric motor according to a first embodiment of the present disclosure. FIG. 2 is a plan view showing a piezoelectric actuator. FIG. 3 is a cross-sectional view along the line A-A in FIG. 2. FIG. 4 is a cross-sectional view along the line B-B in FIG. 2. FIG. 5 is a cross-sectional view along the line C-C in FIG. 2. FIG. 6 is a cross-sectional view along the line D-D in FIG. 2. FIG. 7 is a diagram showing an alternating voltage to be applied to the piezoelectric actuator shown in FIG. 2. FIG. 8 and FIG. 9 are each a plan view showing the driving state of the piezoelectric motor shown in FIG. 1. FIG. 10 is a cross-sectional view along the line E-E in FIG. 1. FIG. 11 is a top view showing a biasing member. FIG. 12 is a bottom view showing the biasing member. FIG. 13 is a plan view showing a separation state between a rotor and a protruding part. FIG. 14 is a graph showing a relationship between alternating voltages V1, V3 and the driving speed of the rotor. FIG. 15 is a block diagram showing a control device.

It should be noted that hereinafter, three axes perpendicular to each other are defined as an X axis, a Y axis, and a Z axis, and a direction parallel to the X axis is also referred to as an X-axis direction, a direction parallel to the Y axis is also referred to as a Y-axis direction (a first direction), and a direction parallel to the Z axis is also referred to as a Z-axis direction (a second direction) for the sake of convenience of explanation. Further, the arrow side of each of the axes is also referred to as a "positive side," and the opposite side to the arrow is also referred to as a "negative side." Further, the positive side in the X-axis direction is also referred to as "above or an upper side" and the negative side in the X-axis direction is also referred to as "below or a lower side."

The piezoelectric motor 1 shown in FIG. 1 has a rotor 2 as a driven section having a disk-like shape and rotatable around the central axis O, and a piezoelectric drive device 3 having contact with an outer circumferential surface 21 of the rotor 2. In such a piezoelectric motor 1, when making the piezoelectric drive device 3 perform a flexural vibration, the rotor 2 rotates around the central axis O parallel to the X axis. It should be noted that the configuration of the piezoelectric motor 1 is not limited to the configuration shown in FIG. 1. For example, it is also possible to dispose a plurality of piezoelectric drive devices 3 along a circumferential direction of the rotor 2 to rotate the rotor 2 by drive of the plurality of piezoelectric drive devices 3. Further, the piezoelectric drive device 3 can have contact with a principal surface 22 of the rotor 2 instead of the outer circumferential surface of the rotor 2. Further, the driven section is not limited to a rotating body such as the rotor 2, but can also be, for example, a slider which moves linearly.

Further, in the present embodiment, the rotor 2 is provided with an encoder 9, and due to the encoder 9, it is possible to detect a behavior, in particular, an amount of rotation and an angular velocity of the rotor 2. The encoder 9 is not particularly limited, but can also be, for example, an incremental-type encoder for detecting the amount of rotation of the rotor 2 while the rotor 2 is rotating, or can also be an absolute-type encoder for detecting an absolute position from the origin of the rotor 2 regardless of the presence or absence of the rotation of the rotor 2.

The encoder 9 of the present embodiment has a scale 91 fixed to an upper surface of the rotor 2, and an optical element 92 disposed on an upper side of the scale 91. Further, the scale 91 has a disk-like shape, and a pattern not shown is disposed on an upper surface of the scale 91. Meanwhile, the optical element 92 has a light emitting element 921 for emitting light toward the pattern of the scale 91, and an imaging element 922 for taking an image of the pattern of the scale 91. In the encoder 9 having such a configuration, by performing template matching on the image of the pattern obtained by the imaging element 922, it is possible to detect the amount of rotation, the driving speed (the angular velocity), the absolute position and so on of the rotor 2. It should be noted that the configuration of the encoder 9 is not limited to the configuration described above. For example, it is also possible to adopt a configuration provided with a light receiving element for receiving reflected light or transmitted light from the scale 91 instead of the imaging element 922.

Further, the piezoelectric drive device 3 has a piezoelectric actuator 4, a biasing member 5 for biasing the piezoelectric actuator 4 toward the rotor 2, and a control device 7 for controlling drive of the piezoelectric actuator 4.

As shown in FIG. 2, the piezoelectric actuator 4 has a vibrating body 41, a support part 42, coupling parts 43 and a protruding part 44, wherein the support part 42 supports the vibrating body 41, the coupling parts 43 couple the vibrating body 41 and the support part 42 to each other, and the protruding part 44 is coupled to the vibrating body 41 to transmit the vibration of the vibrating body 41 to the rotor 2.

The vibrating body 41 has a plate shape having the X-axis direction as the thickness direction and spreading in a Y-Z plane including the Y axis and the Z axis, and flexurally vibrates into an S-shape by bending in the Z-axis direction (the second direction) while extending and contracting in the Y-axis direction (the first direction). Further, the vibrating body 41 has an elongated shape having the Y-axis direction, which is the stretching direction, as the longitudinal direction in a plan view from the X-axis direction. It should be noted that the shape of the vibrating body 41 is not particularly limited providing the function thereof can be exerted.

Further, as shown in FIG. 2, the vibrating body has driving piezoelectric elements 6A through 6E for flexurally vibrating the vibrating body 41, and detecting piezoelectric elements 6F, 6G for detecting the vibration of the vibrating body 41.

The piezoelectric element 6C is disposed along the longitudinal direction (the Y-axis direction) of the vibrating body 41 in a central part of the vibrating body 41. On the positive side in the Z-axis direction of the vibrating body 41 with respect to the piezoelectric element 6C, there are arranged the piezoelectric elements 6A, 6B along the longitudinal direction of the vibrating body 41, and on the negative side in the Z-axis direction, there are arranged the piezoelectric elements 6D, 6E along the longitudinal direction of the vibrating body 41. Further, these piezoelectric elements 6A through 6E each extend and contract in the longitudinal direction (the Y-axis direction) of the vibrating body 41 due to energization. Further, the piezoelectric elements 6A, 6E are electrically connected to each other, and the piezoelectric elements 6B, 6D are electrically connected to each other. As described later, by applying alternating voltages the same in frequency and different in phase respectively to the piezoelectric element 6C, the piezoelectric elements 6A, 6E and the piezoelectric elements 6B, 6D to thereby shift the extending and contracting timings thereof from each other, it is possible to flexurally vibrate the vibrating body 41 into an S-shape in the plane thereof.

The piezoelectric element 6F is located on the tip side (the positive side in the Y-axis direction) of the piezoelectric element 6C, and the piezoelectric element 6G is located on the base end side (the negative side in the Y-axis direction) of the piezoelectric element 6C. In other words, the piezoelectric elements 6F, 6G are each arranged with the piezoelectric element 6C in the stretching direction (the Y-axis direction) of the piezoelectric element 6C. Further, the piezoelectric elements 6F, 6G are electrically connected to each other. These piezoelectric elements 6F, 6G receive an external force corresponding to the vibration of the vibrating body 41 due to the drive of the piezoelectric elements 6A through 6E, and then output signals corresponding to the external force thus received. Therefore, it is possible to detect the vibrating state of the vibrating body 41 based on the signals output from the piezoelectric elements 6F, 6G. It should be noted that the description that "the piezoelectric elements 6F, 6G are arranged with the piezoelectric element 6C in the stretching direction of the piezoelectric element 6C" means that at least a part of each of the piezoelectric elements 6F, 6G is located in an area defined by extending the piezoelectric element 6C in the stretching direction (the Y-axis direction), and preferably means that the entire area of the piezoelectric elements 6F, 6G is located there.

Further, the piezoelectric elements 6F, 6G are each disposed in a part to be a node of the flexural vibration of the vibrating body 41. The node of the flexural vibration denotes a part where the swing in the Z-axis direction becomes substantially 0 (zero), namely a part where the flexural vibration does not substantially occur. By arranging the piezoelectric elements 6F, 6G with the piezoelectric element 6C in the stretching direction (the Y-axis direction) of the piezoelectric element 6C, and at the same time disposing the piezoelectric elements 6F, 6G in the parts each including the node of the flexural vibration of the vibrating body 41 in such a manner, a stretching vibration in the Y-axis direction of the vibrating body 41 becomes easy to propagate to the piezoelectric elements 6F, 6G, and at the same time the flexural vibration in the Z-axis direction of the vibrating body 41 becomes hard to propagate to the piezoelectric elements 6F, 6G. In other words, it is possible to decrease the sensitivity to the flexural vibration while increasing the sensitivity to the stretching vibration. Therefore, it is possible to more accurately detect the stretching vibration in the Y-axis direction of the vibrating body 41 with the piezoelectric elements 6F, 6G.

It should be noted that the arrangement of the piezoelectric elements 6F, 6G is not particularly limited providing the stretching vibration in the Y-axis direction of the vibrating body 41 can be detected, and it is also possible for each of the piezoelectric elements 6F, 6G to be disposed in, for example, a part to be an antinode of the flexural vibration of the vibrating body 41.

Further, the support part 42 supports the vibrating body 41. The support part 42 has a U-shape surrounding the base end side (the negative side in the Y-axis direction) of the vibrating body 41 in a plan view from the X-axis direction. It should be noted that the shape and the arrangement are not particularly limited providing the function thereof can be exerted.

Further, the coupling parts 43 each couple a part to be a node of the flexural vibration, specifically a central part in the Y-axis direction of the vibrating body 41, and the support part 42 to each other. The coupling parts 43 each have a first coupling part 431 located on the negative side in the Z-axis direction with respect to the vibrating body 41, and a second coupling part 432 located on the positive side in the Z-axis direction. It should be noted that the configuration of the coupling parts 43 is not particularly limited providing the function thereof can be exerted.

Such a vibrating body 41, a support part 42 and coupling parts 43 as described above have the configuration in which two piezoelectric element units 60 are bonded to each other so as to face each other as shown in FIG. 3 through FIG. 6. Each of the piezoelectric element units 60 has a substrate 61, driving piezoelectric elements 60A, 60B, 60C, 60D and 60E, and detecting piezoelectric elements 60F, 60G disposed on the substrate 61, and a protective layer 63 for covering each of the piezoelectric elements 60A through 60G. The substrate 61 is not particularly limited, but it is possible to use, for example, a silicon substrate.

The piezoelectric elements 60A through 60G each have a first electrode 601 disposed on the substrate 61, a piezoelectric body 602 disposed on the first electrode 601 and a second electrode 603 disposed on the piezoelectric body 602. The first electrode 601 is commonly disposed to the piezoelectric elements 60A through 60G. In contrast, the piezoelectric bodies 602 and the second electrodes 603 are individually provided to the piezoelectric elements 60A through 60G, respectively.

The two piezoelectric units 60 are bonded to each other via an adhesive 69 in the state in which the surfaces on the side where the piezoelectric elements 60A through 60G are disposed are opposed to each other. Further, the first electrodes 601 of the respective piezoelectric element units 60 are electrically connected to each other via interconnections and so on not shown. Further, the second electrodes 603 provided to the piezoelectric elements 60A of the respective piezoelectric element units 60 are electrically connected to each other via interconnections and so on not shown, and the piezoelectric element 6A is constituted by these two piezoelectric elements 60A. Substantially the same is applied to other piezoelectric elements 60B through 60G, the piezoelectric element 6B is constituted by the two piezoelectric elements 60B, the piezoelectric element 6C is constituted by the two piezoelectric elements 60C, the piezoelectric element 6D is constituted by the two piezoelectric elements 60D, the piezoelectric element 6E is constituted by the two piezoelectric elements 60E, the piezoelectric element 6F is constituted by the two piezoelectric elements 60F, and the piezoelectric element 6G is constituted by the two piezoelectric elements 60G.

The constituent material of the piezoelectric bodies 602 is not particularly limited, and there can be used piezoelectric ceramics such as lead zirconium titanate (PZT), barium titanate, lead titanate, potassium niobate, lithium niobate, lithium tantalate, sodium tungstate, zinc oxide, barium strontium titanate (BST), strontium bismuth tantalate (SBT), lead metaniobate, or lead scandium niobate. Further, as the piezoelectric body 602, it is also possible to use polyvinylidene fluoride, quartz crystal, and so on besides the piezoelectric ceramics described above.

Further, the formation method of the piezoelectric bodies 602 is not particularly limited, and the piezoelectric bodies 602 can also be formed from a bulk material, or can also be formed using a sol-gel method, or a sputtering method. In the present embodiment, the piezoelectric bodies 602 are formed using a sol-gel method. Thus, it is possible to obtain the piezoelectric body 602 thinner than in the case of, for example, forming the piezoelectric body 602 from a bulk material, and it is possible to achieve reduction in thickness of the piezoelectric drive device 3.

The protruding part 44 is disposed in a tip part of the vibrating body 41, and protrudes from the vibrating body 41 toward the positive side in the Y-axis direction. Further, the tip part of the protruding part 44 has contact with the outer circumferential surface 21 of the rotor 2. Therefore, the vibration of the vibrating body 41 is transmitted to the rotor 2 via the protruding part 44. The constituent material of the protruding part 44 is not particularly limited, but there can be cited a variety of types of ceramics such as zirconia, alumina and titania. Thus, the protruding part 44 excellent in durability is obtained.

For example, when applying the alternating voltage V1 shown in FIG. 7 to the piezoelectric elements 6A, 6E, the alternating voltage V2 to the piezoelectric element 6C, and the alternating voltage V3 to the piezoelectric elements 6B, 6D, as shown in FIG. 8, the vibrating body 41 flexurally vibrates into an S-shape in the Z-axis direction while making the stretching vibration in the Y-axis direction, and these vibrations are combined with each other, and the tip of the protruding part 44 makes an elliptic motion (a rotational motion) of drawing an elliptic orbit counterclockwise as indicated by the arrow A1. The rotor 2 is fed by such an elliptic motion of the protruding part 44, and thus, the rotor 2 rotates clockwise as indicated by the arrow B1. Further, in accordance with such a vibration of the vibrating body 41, a pickup voltage Vpu is output from the piezoelectric elements 6F, 6G.

It should be noted that in the elliptic motion of the protruding part 44 indicated by the arrow A1, the protruding part 44 has contact with the outer circumferential surface 21 of the rotor 2 to feed the rotor 2 in the direction of the arrow B1 from the point A1' to the point A1", and the protruding part 44 is separated from the outer circumferential surface 21 of the rotor 2 from the point A1" to the point A1'. Therefore, the rotation to the opposite side to the arrow B1 of the rotor 2 is inhibited.

Further, when switching between the alternating voltages V1, V3, namely when applying the alternating voltage V1 to the piezoelectric elements 6B, 6D, the alternating voltage V2 to the piezoelectric element 6C, and the alternating voltage V3 to the piezoelectric elements 6A, 6E, as shown in FIG. 9, the vibrating body 41 flexurally vibrates into an S-shape in the Z-axis direction while making the stretching vibration in the Y-axis direction, and these vibrations are combined with each other, and the protruding part 44 makes an elliptic motion clockwise as indicated by the arrow A2. The rotor 2 is fed by such an elliptic motion of the protruding part 44, and thus, the rotor 2 rotates counterclockwise as indicated by the arrow B2. Further, in accordance with such a vibration of the vibrating body 41, a pickup voltage Vpu is output from the piezoelectric elements 6F, 6G.

It should be noted that in the elliptic motion of the protruding part 44 indicated by the arrow A2, the protruding part 44 has contact with the outer circumferential surface 21 of the rotor 2 to feed the rotor 2 in the direction of the arrow B2 from the point A2' to the point A2", and the protruding part 44 is separated from the outer circumferential surface 21 of the rotor 2 from the point A2" to the point A2'. Therefore, the rotation to the opposite side to the arrow B2 of the rotor 2 is inhibited.

It should be noted that in the present disclosure, the pattern of the alternating voltage to be applied to the piezoelectric elements 6A through 6E is not particularly limited providing the rotor 2 can be rotated in at least one direction. Further, the voltage to be applied to the piezoelectric elements 6A through 6E can also be, for example, a direct-current voltage applied intermittently instead of the alternating voltage.

The biasing member 5 is a member for biasing the protruding part 44 toward the outer circumferential surface 21 of the rotor 2. As shown in FIG. 10, the biasing member 5 has a first substrate 51 located on the upper surface side (the positive side in the X-axis direction) of the piezoelectric actuator 4, and a second substrate 52 located on the bottom surface side (the negative side in the X-axis direction) of the piezoelectric actuator 4. Further, the piezoelectric actuator 4 is sandwiched between the first substrate 51 and the second substrate 52. It should be noted that the first substrate 51 and the second substrate 52 are not particularly limited, but it is possible to use, for example, a silicon substrate.

Here, in the present embodiment, one piezoelectric actuator 4 is sandwiched between the first substrate 51 and the second substrate 52, but this is not a limitation, and it is also possible to adopt a configuration in which, for example, a stacked body having a plurality of piezoelectric actuators 4 stacked on one another is sandwiched between the first substrate 51 and the second substrate 52. Thus, since the number of the piezoelectric actuators 4 included in one piezoelectric drive device 3 increases, it is possible to rotate the rotor 2 with higher torque accordingly.

As shown in FIG. 11, the first substrate 51 has a base part 511, a support part 512, and spring parts 513, wherein the base part 511 is fixed to the upper surface of the support part 42, and the spring parts 513 couple the base part 511 and the support part 512 to each other. Similarly, as shown in FIG. 12, the second substrate 52 has a base part 521, a support part 522, and spring parts 523, wherein the base part 521 is fixed to the lower surface of the support part 42, and the spring parts 523 couple the base part 521 and the support part 522 to each other. The first substrate 51 and the second substrate 52 have the same shape and the same size, and are symmetrically disposed about the piezoelectric actuator 4.

Further, as shown in FIG. 10, between the support parts 512, 522, there is disposed a spacer 53 with an equal thickness to that of the piezoelectric actuator 4. Further, in that part, there are formed through holes 59 each penetrating in the X-axis direction, and the biasing member 5 is screw fixed to a chassis or the like using the through holes 59. By fixing the biasing member 5 to the chassis or the like described above in the state in which the spring parts 513, 523 are deflected in the Y-axis direction, it is possible to bias the protruding part 44 toward the outer circumferential surface 21 of the rotor 2 using restoring forces of the spring parts 513, 523.

The biasing member 5 is hereinabove described, but the configuration of the biasing member 5 is not particularly limited providing the protruding part 44 can be biased toward the outer circumferential surface 21 of the rotor 2. For example, it is also possible to omit either one of the first substrate 51 and the second substrate 52. Further, for example, coil springs, plate springs or the like can also be used as the biasing member 5.

The control device 7 applies the alternating voltages V1, V2 and V3 to the piezoelectric elements 6A through 6E to thereby control the drive of the piezoelectric drive device 3. First of all, a function of the control device 7 will briefly be described. It should be noted that as shown in FIG. 8, the case of rotating the rotor 2 in the direction of the arrow B1 will hereinafter be described as a representative for the sake of convenience of explanation. The case of rotating the rotor 2 in the direction of the arrow B2 as shown in FIG. 9 is substantially the same as the case of rotating the rotor 2 in the direction of the arrow B1, and therefore the description thereof will be omitted.

The rotor 2 has a disk-like shape as described above, but it is extremely difficult to make the planar shape coincide with a true circle in the manufacturing technology, and further the planar shape deteriorates from the true circle due to partial wear of the outer circumferential surface 21 with the use of the rotor 2 in some cases. In other words, the circularity deteriorates in some cases. When the rotor 2 is deteriorated from the true circle in such a manner, the radius varies by parts of the outer circumferential surface 21, and the separation distance D between the outer circumferential surface 21 and the protruding part 44 in a range from the point A1" to the point A1' in the arrow A1 varies by parts in the circumferential direction of the outer circumferential surface 21 in accordance with the variation in the radius. When the separation distance D varies as described above, the feeding force of the rotor 2 due to the elliptic motion of the protruding part 44 generated in a range from the point A1' to the point A1" varies, and the rotation of the rotor 2 becomes unstable. It should be noted that the separation distance D denotes a separation distance between the protruding part 44 and the outer circumferential surface 21 at the lower dead point P0, namely the farthest point from the outer circumferential surface 21, of the protruding part 44 making the elliptic motion as shown in FIG. 13.

Here, since the protruding part 44 vibrates in the Y-axis direction due to the extension and the contraction of the piezoelectric element 6C, by controlling the amplitude of the alternating voltage V2 to be applied to the piezoelectric element 6C, it is possible to control the separation distance D. Specifically, when increasing the amplitude of the alternating voltage V2, the separation distance D increases, and in contrast, when decreasing the amplitude of the alternating voltage V2, the separation distance D decreases. Therefore, the control device 7 controls the amplitude of the alternating voltage V2 to be applied to the piezoelectric element 6C so that the variation in the separation distance D becomes as small as possible in the entire circumference of the outer circumferential surface 21. Thus, the variation in the separation distance D is suppressed, the feeding force of the rotor 2 due to the elliptic motion of the protruding part 44 is stabilized, and thus, the rotation of the rotor is stabilized. Therefore, the piezoelectric motor 1 capable of performing the smooth drive is obtained.

Further, since the protruding part 44 vibrates in the Z-axis direction due to the extension and the contraction of the piezoelectric elements 6A, 6B, 6D and 6E to feed the rotor 2 in the direction of the arrow B1, by controlling the amplitude of the alternating voltage V1 to be applied to the piezoelectric elements 6A, 6E and the amplitude of the alternating voltage V3 to be applied to the piezoelectric elements 6B, 6D, it is possible to control the drive speed of the rotor 2. Specifically, when increasing the amplitude of the alternating voltages V1, V3, the swing in the Z-axis direction of the protruding part 44 increases, and the drive speed of the rotor 2 increases, and in contrast, when decreasing the amplitude of the alternating voltages V1, V3, the swing in the Z-axis direction of the protruding part 44 decreases and the drive speed of the rotor 2 decreases. Then, the control device 7 controls the amplitude of the alternating voltages V1, V3 so that the rotor 2 is at a target position at each time point to control the drive speed of the rotor 2. Thus, it is possible to suppress the displacement at each time point of the rotor 2, and the piezoelectric motor 1 having an excellent drive characteristic is obtained.

It should be noted that the amplitude of the alternating voltage V1 and the drive speed of the rotor 2 have a substantially linear relationship regardless of the magnitude of the pickup voltage Vpu described later. The same applies to the alternating voltage V3.

The control device 7 having such a function has a voltage control section 70 for controlling the alternating voltages V1, V2 and V3 as shown in FIG. 15. Further, the voltage control section 70 has a first voltage control section 71, a second voltage control section 72 and a frequency control section 73, wherein the first voltage control section 71 applies the alternating voltage V2 to the piezoelectric element 6C for making the vibrating body 41 make the stretching vibration in the Y-axis direction, the second voltage control section 72 applies the alternating voltages V1, V3 to the piezoelectric elements 6A, 6B, 6D and 6E for making the vibrating body 41 flexurally vibrate in the Z-axis direction, and the frequency control section 73 controls the frequency of the alternating voltages V1, V2 and V3.

The first voltage control section 71 has a PU voltage control section 711, a first PWM waveform generation section 712, and a first drive circuit 713, and feeds back the pickup voltage Vpu output from the piezoelectric elements 6F, 6G to thereby control the alternating voltage V2 so that the pickup voltage Vpu becomes the target value (a constant value). In other words, the lower the pickup voltage Vpu is, the larger the first voltage control section 71 makes the amplitude of the alternating voltage V2. Since the pickup voltage Vpu and the separation distance D have a correlative relationship, by keeping the pickup voltage Vpu in the target value, the variation in the separation distance D is suppressed, and thus, the piezoelectric motor 1 capable of performing the stable drive is obtained.

To the PU voltage control section 711, there are input an amplitude command Vm as the target amplitude value of the pickup voltage Vpu, and the pickup voltage Vpu output from the piezoelectric elements 6F, 6G from a host computer not shown. The PU voltage control section 711 differentiates the amplitude command Vm and the pickup voltage Vpu, performs PI control for performing proportional control for adjusting the proportional gain and integrating control for adjusting the integral gain with respect to the deviation from the actual amplitude, to generate a voltage command so that the pickup voltage Vpu has the amplitude based on the amplitude command Vm.

Meanwhile, to the frequency control section 73, the alternating voltage V2 generated in the first drive circuit 713, and the pickup voltage Vpu output from the piezoelectric elements 6F, 6G are input. The frequency control section 73 obtains a phase difference between the alternating voltage V2 and the pickup voltage Vpu, performs PI control for performing proportional control for adjusting the proportional gain and integrating control for adjusting the integral gain with respect to the deviation between the target phase difference set in advance and the actual phase difference, to generate a frequency command so that the actual phase difference becomes a phase difference based on the target phase difference. It should be noted that by varying the frequency of the alternating voltage V2, it is possible to vary the phase difference between the alternating voltage V2 and the pickup voltage Vpu.

The first PWM waveform generation section 712 generates a pulse wave Pd having a duty cycle with which the amplitude of the alternating voltage V2 generated by the first drive circuit 713 becomes the amplitude based on the voltage command, and at the same time, the frequency thereof becomes the frequency based on the frequency command. Then, the first drive circuit 713 generates the alternating voltage V2 from the pulse wave Pd generated by the first PWM waveform generation section 712. The configuration of the first drive circuit 713 is not particularly limited providing the first drive circuit 713 can generate the alternating voltage V2, and it is possible to adopt a configuration provided with, for example, a switching circuit and a coil.

The second voltage control section 72 has a position command control section 721, a position control section 722, a speed control section 723, a second PWM waveform generation section 724, a third PWM waveform generation section 725, a second drive circuit 726, and a third drive circuit 727, and feeds back a signal output from an encoder 9 to thereby control the alternating voltages V1, V3 so that the position of the rotor 2 becomes the target position at each time point. In other words, the second voltage control section 72 controls the alternating voltages V1, V3 based on the drive speed of the rotor 2.

The position command control section 721 generates the position command representing the target position of the rotor 2 and outputs the position command based on, for example, a command from a host computer not shown. The position control section 722 performs the P control for performing the proportional control for adjusting the proportional gain with respect to the deviation between the position command and the current position detected by the encoder 9 to generate the speed command so that the position based on the position command is achieved. The speed control section 723 performs the PI control for performing the proportional control for adjusting the proportional gain and the integrating control for adjusting the integral gain with respect to the deviation between the speed command generated by the position control section 722 and the current drive speed of the rotor 2 detected by the encoder 9 to generate the voltage command so that the drive speed based on the speed command is achieved.

The second PWM waveform generation section 724 generates a pulse wave Pd having a duty cycle with which the amplitude of the alternating voltage V1 generated by the second drive circuit 726 becomes the amplitude based on the voltage command generated by the speed control section 723, and at the same time, the frequency thereof becomes the frequency based on the frequency command generated by the frequency control section 73. Then, the second drive circuit 726 generates the alternating voltage V1 from the pulse wave Pd generated by the second PWM waveform generation section 724. The configuration of the second drive circuit 726 is not particularly limited providing the second drive circuit 726 can generate the alternating voltage V1, and it is possible to adopt a configuration substantially the same as that of, for example, the first drive circuit 713 described above.

The third PWM waveform generation section 725 generates a pulse wave Pd having a duty cycle with which the amplitude of the alternating voltage V3 generated by the third drive circuit 727 becomes the amplitude based on the voltage command generated by the speed control section 723, and at the same time, the frequency thereof becomes the frequency based on the frequency command generated by the frequency control section 73. Then, the third drive circuit 727 generates the alternating voltage V3 from the pulse wave Pd generated by the third PWM waveform generation section 725. The configuration of the third drive circuit 727 is not particularly limited providing the third drive circuit 727 can generate the alternating voltage V3, and it is possible to adopt a configuration substantially the same as that of, for example, the first drive circuit 713 or the second drive circuit 726 described above.

By applying the alternating voltages V1, V2 and V3 generated in such a manner as described above to the piezoelectric elements 6A through 6E, the protruding part 44 makes the elliptic motion in the arrow direction, and the rotor 2 rotates in the direction of the arrow B1 in accordance with the elliptic motion.

According to such a control device 7 as described above, since the amplitude of the alternating voltage V2 is controlled so that the pickup voltage Vpu becomes the target value by feeding back the pickup voltage Vpu, the variation in the separation distance D is suppressed compared to the case in which such control is not performed, namely the case of making the amplitude of the alternating voltage V2 constant regardless of the pickup voltage Vpu, and the piezoelectric motor 1 capable of performing the stable drive is obtained. Further, since the amplitudes of the alternating voltages V1, V3 are controlled so that the rotor is located at the target position by feeding back the detection result of the encoder 9, the shift of the rotor 2 from the target position is suppressed to make the piezoelectric motor 1 capable of the stable drive compared to the case in which such control is not performed.

Then, there will be described a method of applying the alternating voltages V1, V2 and V3 when starting the rotation of the rotor 2, namely when causing the elliptic motion in the protruding part 44. As described above, since the protruding part 44 is pressed against the rotor 2 by the biasing member 5, it is difficult to cause the elliptic vibration in the protruding part 44, and therefore, in the past, there has been performed "down sweep" for applying the alternating voltages V1, V2 and V3 at the same time, and then gradually lowering the frequency of the alternating voltages V1, V2 and V3 thus applied to thereby cause the elliptic motion in the protruding part 44. However, in such a related-art method, the time for gradually lowering the frequency of the alternating voltages V1, V2 and V3 is necessary, and the time until the elliptic motion is caused in the protruding part 44 is elongated accordingly.

In contrast to such a related-art method, the control device 7 of the present embodiment applies the alternating voltage V2 to the piezoelectric element 6C to start the vibration in the Y-axis direction of the protruding part 44, and then applies the alternating voltage V1 to the piezoelectric elements 6A, 6E and at the same time applies the alternating voltage V3 to the piezoelectric elements 6B, 6D. In other words, the application of the alternating voltage V1 to the piezoelectric elements 6A, 6E and the application of the alternating voltage V3 to the piezoelectric elements 6B, 6D are started at a later time point than the time point when starting the application of the alternating voltage V2 to the piezoelectric element 6C. According to such an application method, since it results in that the protruding part 44 is further vibrated in the Z-axis direction in the state in which the protruding part 44 is vibrating in the Y-axis direction while keeping the separation distance D constant, namely after the state in which the protruding part 44 is pressed against the rotor 2 has been dissolved, it is possible to cause the elliptic motion in the protruding part 44 easily and in a short time compared to the related art. It should be noted that the time point when starting the application of the alternating voltage V1 and the time point when starting the application of the alternating voltage V3 can be the same as, or can also be different from each other.

Then, there will be described a method of applying the alternating voltages V1, V2 and V3 when switching the rotational direction of the rotor 2. It should be noted that since the control method is the same between the case of switching the rotational direction of the rotor 2 from the arrow B1 to the arrow B2 and the case of switching the rotational direction from the arrow B2 to the arrow B1, the case of switching the rotational direction of the rotor 2 from the arrow B1 to the arrow B2 will hereinafter be described as a representative for the sake of convenience of explanation.

In the past, firstly, the application of the alternating voltages V1, V2 and V3 is stopped to stop the rotation of the rotor 2 in the direction of the arrow B1, and then the "down sweep" described above is performed to restart the rotation of the rotor 2 in the direction of the arrow B2 to thereby switch the rotational direction of the rotor 2. However, in such a method, the time when switching the rotational direction of the rotor 2 becomes long on substantially the same grounds as described above.

In contrast to such a related-art method, the control device 7 of the present embodiment firstly stops the application of the alternating voltage V1 to the piezoelectric elements 6A, 6E and the application of the alternating voltage V3 to the piezoelectric elements 6B, 6D. Thus, since there is achieved the state in which the protruding part 44 vibrates only in the Y-axis direction, the rotation in the direction of the arrow B1 of the rotor 2 stops. Then, the control device 7 starts the application of the alternating voltage V1 to the piezoelectric elements 6B, 6D and the application of the alternating voltage V3 to the piezoelectric elements 6A, 6E. Thus, since there is achieved the state in which the protruding part 44 makes the elliptic motion in the direction of the arrow A2, the rotation in the direction of the arrow B2 of the rotor 2 is started. In other words, the control device 7 exchanges the alternating voltages V1, V3 for each other while continuing the application of the alternating voltage V2 to thereby switch the rotational direction of the rotor 2. According to such a method, it is possible to switch the rotational direction of the rotor 2 more easily and in a shorter time. The time point when stopping the application of the alternating voltage V1 and the time point when stopping the application of the alternating voltage V3 can be the same as, or can also be different from each other. Similarly, the time point when starting the application of the alternating voltage V1 and the time point when starting the application of the alternating voltage V3 can be the same as, or can also be different from each other.

As another method of switching the rotational direction of the rotor 2, the control device 7 of the present embodiment firstly stops the application of the alternating voltage V1 to the piezoelectric elements 6A, 6E and the application of the alternating voltage V3 to the piezoelectric elements 6B, 6D, and then stops the application of the alternating voltage V2 to the piezoelectric element 6C. Thus, the elliptic motion of the protruding part 44 stops to stop the rotation of the rotor 2. It should be noted that this is not a limitation, and it is also possible to, for example, stop the application of the alternating voltages V1, V2 and V3 at the same time. Then, similarly to the case of starting the rotation of the rotor 2 described above, the control device 7 applies the alternating voltage V2 to the piezoelectric element 6C to start the vibration in the Y-axis direction of the protruding part 44, and then applies the alternating voltage V1 to the piezoelectric elements 6A, 6E and at the same time applies the alternating voltage V3 to the piezoelectric elements 6B, 6D. According to such an application method, since it results in that the protruding part 44 is further vibrated in the Z-axis direction in the state in which the protruding part 44 is vibrating in the Y-axis direction while keeping the separation distance D constant, it is possible to cause the elliptic motion in the protruding part 44 easily and in a short time compared to the related art which performs the down sweep. It should be noted that the time point when starting the application of the alternating voltage V1 and the time point when starting the application of the alternating voltage V3 can be the same as, or can also be different from each other.

The piezoelectric motor 1 is hereinabove described. The piezoelectric drive device 3 included in such a piezoelectric motor 1 is a piezoelectric drive device provided with the vibrating body 41 and the protruding part coupled to the vibrating body 41, and vibrates the vibrating body 41 to make the tip of the protruding part 44 make the elliptic motion (a rotational motion) of drawing an elliptic orbit to thereby drive the rotor 2 as a driven member having contact with the protruding part 44. Further, the vibrating body 41 is provided with the substrate 61, the piezoelectric elements 6A through 6E as the driving piezoelectric elements for vibrating the substrate 61, and the piezoelectric elements 6F, 6G as the detecting piezoelectric elements for detecting the vibration of the substrate 61. Further, the driving piezoelectric elements are provided with the piezoelectric element 6C as a first driving piezoelectric element for making the vibrating body 41 perform the stretching vibration in the Y-axis direction as a first direction in which the vibrating body 41 and the protruding part 44 are arranged side by side, and the piezoelectric elements 6A, 6B, 6D and 6E as second driving piezoelectric elements for flexurally vibrating the vibrating body 41 in the Z-axis direction as a second direction perpendicular to the Y-axis direction in a plan view of the substrate 61, and the piezoelectric elements 6F, 6G are arranged with the piezoelectric element 6C side by side in the Y-axis direction. Further, the piezoelectric drive device 3 is provided with the voltage control section for controlling the magnitude (the amplitude) of the alternating voltage V2 as a voltage to be applied to the piezoelectric element 6C based on the pickup voltage Vpu as the signal output from the piezoelectric elements 6F, 6G. Then, the voltage control section 70 controls the magnitude (the amplitude) of the alternating voltage V2 to be applied to the piezoelectric element 6C so that the variation in the swing in the Y-axis direction of the protruding part 44 becomes smaller compared to the case in which the magnitude (the amplitude) of the alternating voltage V2 to be applied to the piezoelectric element 6C is not controlled, namely the case in which the amplitude of the alternating voltage V2 is constant. In other words, the magnitude (the amplitude) of the alternating voltage V2 to be applied to the piezoelectric element 6C is controlled so that the variation in the separation distance D decreases. According to such a piezoelectric drive device 3, since the amplitude of the alternating voltage V2 is controlled so that the pickup voltage Vpu becomes the target value by feeding back the pickup voltage Vpu, it is possible to suppress the variation in the separation distance D compared to the case in which such control is not performed. Therefore, the piezoelectric drive device 3 capable of the stable drive is obtained.

Further, as described above, the lower the pickup voltage Vpu output from the piezoelectric elements 6F, 6G is, the larger the voltage control section 70 makes the amplitude of the alternating voltage V2 to be applied to the piezoelectric element 6C. Thus, the variation in the separation distance D can be suppressed.

Further, as described above, the piezoelectric drive device 3 has the biasing member 5 for biasing the vibrating body 41 toward the rotor 2 in the Y-axis direction. Thus, the protruding part 44 is pressed against the rotor 2, and it is possible to efficiently transmit the rotational motion of the protruding part 44 to the rotor 2.

Further, as described above, the voltage control section 70 controls the alternating voltage V1 to be applied to the piezoelectric elements 6A, 6E and the alternating voltage V3 to be applied to the piezoelectric elements 6B, 6D based on the drive speed of the encoder 9. Thus, it is possible to improve the positional accuracy of the rotor 2 at each time point.

Further, as described above, the voltage control section 70 controls the alternating voltage V1 to be applied to the piezoelectric elements 6A, 6E and the alternating voltage V3 to be applied to the piezoelectric elements 6B, 6D based on the drive speed of the rotor 2. Thus, it is possible to improve the positional accuracy of the rotor 2 at each time point.

Further, as described above, the piezoelectric elements 6F, 6G are each disposed in a part including the node of the flexural vibration of the substrate 61. Thus, it is possible to accurately detect the vibration in the Y-axis direction of the substrate 61 with the piezoelectric elements 6F, 6G.

Further, as described above, when switching the direction of the rotational motion of the protruding part 44 to the opposite direction, the voltage control section 70 continues the application of the alternating voltage V2 to the piezoelectric element 6C. Thus, it is possible to more easily and promptly switch the direction of the rotational motion of the protruding part 44.

Further, as described above, when starting the rotational motion of the protruding part 44, the voltage control section 70 starts the application of the alternating voltage V2 to the piezoelectric element 6C, and then starts the application of the alternating voltage V1 to the piezoelectric elements 6A, 6E and the application of the alternating voltage V3 to the piezoelectric elements 6B, 6D. Thus, it is possible to more easily and promptly start the rotational motion of the protruding part 44.

Second Embodiment

Figure 16:
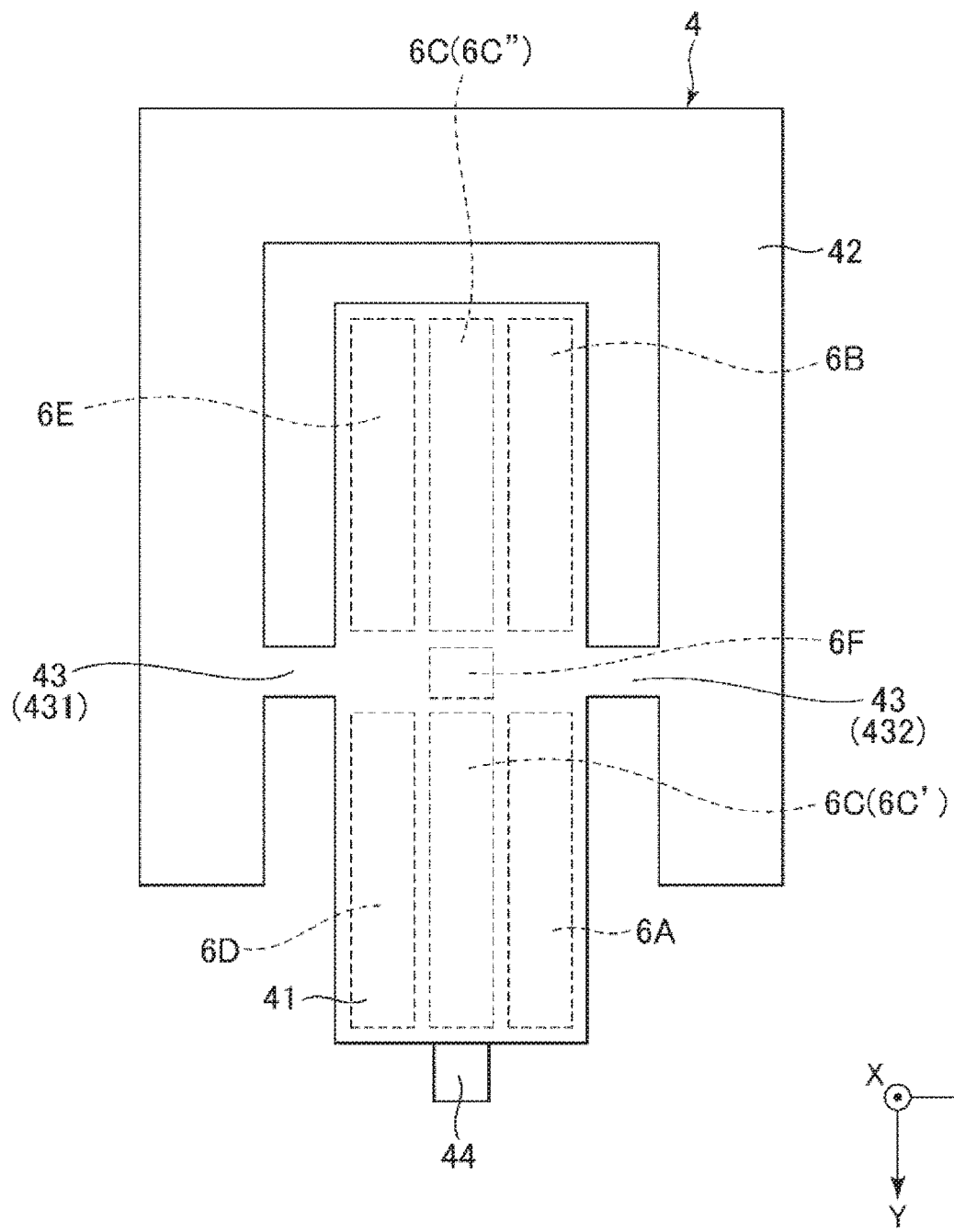
FIG. 16 is a plan view showing a piezoelectric actuator according to a second embodiment of the present disclosure.

FIG. 16 is a plan view showing a piezoelectric actuator according to a second embodiment of the present disclosure.

A piezoelectric motor 1 according to the present embodiment is substantially the same as the piezoelectric motor 1 according to the first embodiment described above except the point that the configuration of the piezoelectric body 41 is different. It should be noted that in the following description, the piezoelectric motor 1 according to the second embodiment will be described with a focus on the difference from the first embodiment described above, and the description of substantially the same issues will be omitted. Further, in FIG. 16, the constituents substantially the same as in the embodiment described above are denoted by the same reference symbols.

As shown in FIG. 16, the vibrating body 41 has the driving piezoelectric elements 6A through 6E, and the detecting piezoelectric element 6F. Further, the piezoelectric element 6C is divided into a first divisional segment 6C' located on the positive side in the Y-axis direction, and a second divisional segment 6C" located on the negative side in the Y-axis direction, and the first divisional segment 6C' and the second divisional segment 6C" are electrically connected to each other. Further, the piezoelectric element 6F is disposed between the first divisional segment 6C' and the second divisional segment 6C". By disposing the piezoelectric element 6F between the first divisional segment 6C' and the second divisional segment 6C", it is possible to efficiently detect the vibration in the Y-axis direction of the vibrating body 41 using the piezoelectric element 6F. Further, the piezoelectric element 6F is disposed in a part to be the node of the flexural vibration of the vibrating body 41. Thus, it becomes hard for the flexural vibration of the vibrating body 41 to propagate to the piezoelectric element 6F, and thus, it is possible to more accurately detect the vibration in the Y-axis direction of the vibrating body 41 with the piezoelectric element 6F.

According also to such a second embodiment as described hereinabove, substantially the same advantages as in the first embodiment described above can be exerted.

Third Embodiment

Figure 17:
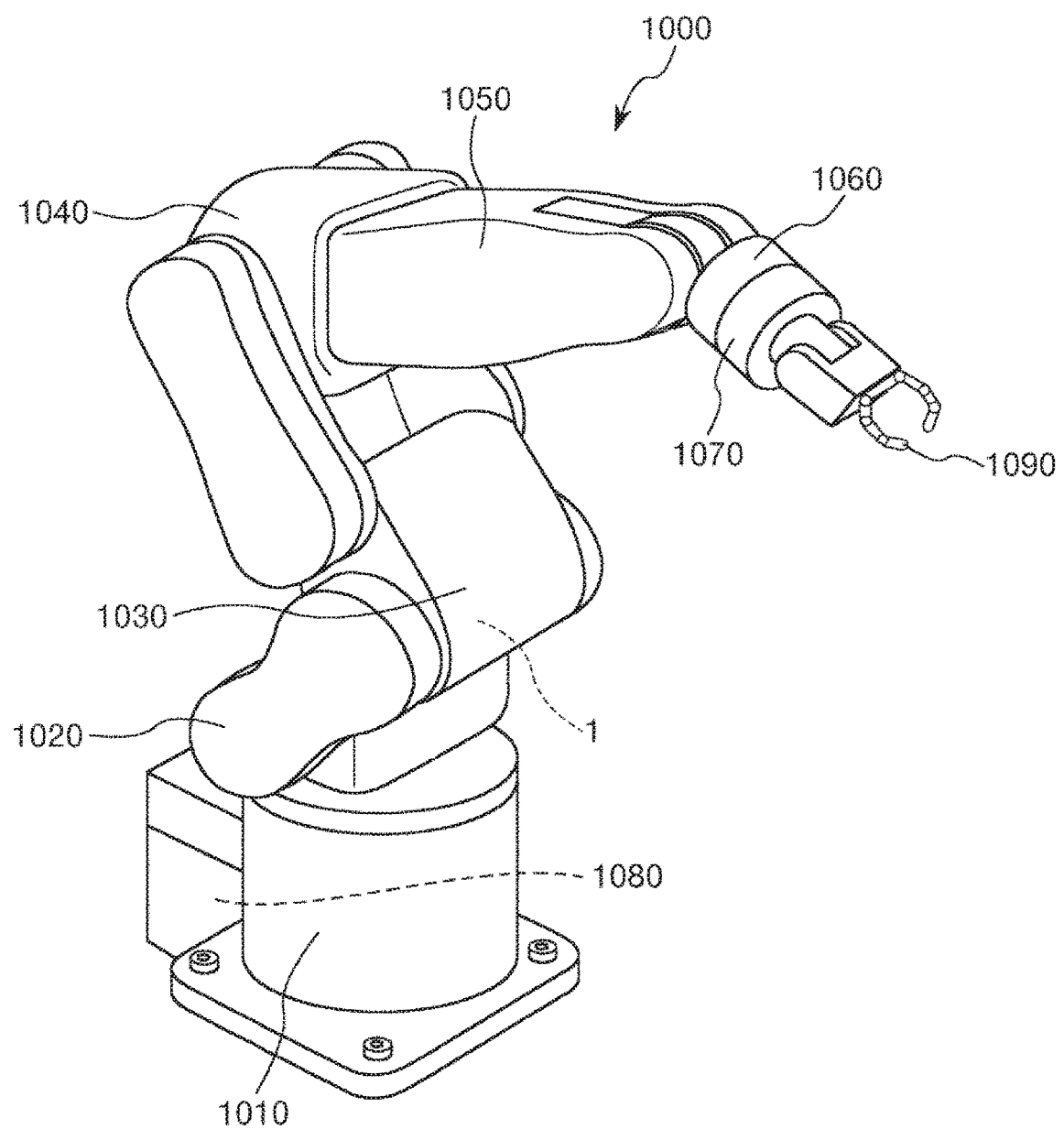
FIG. 17 is a perspective view showing a robot according to a third embodiment of the present disclosure.

FIG. 17 is a perspective view showing a robot according to a third embodiment of the present disclosure.

The robot 1000 shown in FIG. 17 is capable of performing operations such as feeding, removing, transmission, and assembling of precision mechanical equipment or a component constituting the precision mechanical equipment. The robot 1000 is a six-axis robot, and is provided with a base 1010, an arm 1020, an arm 1030, an arm 1040, an arm 1050, an arm 1060, an arm 1070 and a control device 1080, wherein the base 1010 is fixed to the floor or the ceiling, the arm 1020 is rotatably coupled to the base 1010, the arm 1030 is rotatably coupled to the arm 1020, the arm 1040 is rotatably coupled to the arm 1030, the arm 1050 is rotatably coupled to the arm 1040, the arm 1060 is rotatably coupled to the arm 1050, the arm 1070 is rotatably coupled to the arm 1060, and the control device 1080 controls drive of these arms 1020, 1030, 1040, 1050, 1060 and 1070.

Further, the arm 1070 is provided with a hand coupling section, and to the hand coupling section, there is attached an end effector 1090 corresponding to an operation to be performed by the robot 1000. Further, the piezoelectric motor 1 is installed in some or all of joint sections, and due to the drive of the piezoelectric motor 1, each of the arms 1020, 1030, 1040, 1050, 1060, and 1070 rotates. It should be noted that it is also possible for the piezoelectric motor 1 to be installed in the end effector 1090 and used for drive of the end effector 1090.

The control device 1080 is formed of a computer, and has, for example, a processor (CPU), a memory and an I/F (interface). Further, the processor executes a predetermined program (a code string) stored in the memory to thereby control the drive of each section of the robot 1000. It should be noted that the program described above can also be downloaded from an external server via the I/F. Further, it is also possible to adopt a configuration in which some or all of the constituents of the control device 1080 are disposed outside the robot 1000, and are connected via a communication network such as a local area network (LAN).

Such a robot 1000 is provided with the piezoelectric motor 1 as described above. Specifically, the robot 1000 is provided with the piezoelectric drive device 3 which is provided with the vibrating body 41 and the protruding part 44 coupled to the vibrating body 41, and vibrates the vibrating body 41 to make the tip of the protruding part 44 make the rotational motion of drawing an elliptic orbit to thereby drive the rotor 2 as a driven member having contact with the protruding part 44. Further, the vibrating body 41 is provided with the substrate 61, the piezoelectric elements 6A through 6E as the driving piezoelectric elements for vibrating the substrate 61, and the piezoelectric elements 6F, 6G as the detecting piezoelectric elements for detecting the vibration of the substrate 61. Further, the driving piezoelectric elements are provided with the piezoelectric element 6C as the first driving piezoelectric element for making the vibrating body 41 perform the stretching vibration in the Y-axis direction as the first direction in which the vibrating body 41 and the protruding part 44 are arranged side by side, and the piezoelectric elements 6A, 6B, 6D and 6E as the second driving piezoelectric elements for flexurally vibrating the vibrating body 41 in the Z-axis direction as the second direction perpendicular to the Y-axis direction in the plan view of the substrate 61, and the piezoelectric elements 6F, 6G are arranged with the piezoelectric element 6C side by side in the Y-axis direction. Further, the piezoelectric drive device 3 is provided with the voltage control section for controlling the magnitude (the amplitude) of the alternating voltage V2 as a voltage to be applied to the piezoelectric element 6C based on the pickup voltage Vpu as the signal output from the piezoelectric elements 6F, 6G. Then, the voltage control section 70 controls the magnitude (the amplitude) of the alternating voltage V2 to be applied to the piezoelectric element 6C so that the variation in the swing in the Y-axis direction of the protruding part 44 becomes smaller compared to the case in which the magnitude (the amplitude) of the alternating voltage V2 to be applied to the piezoelectric element 6C is not controlled, namely the case in which the amplitude is constant. According to such a piezoelectric drive device 3, since the amplitude of the alternating voltage V2 is controlled so that the pickup voltage Vpu becomes the target value by feeding back the pickup voltage Vpu, it is possible to suppress the variation of the separation distance D compared to the case in which such control is not performed. Therefore, the robot 1000 capable of the stable drive is obtained.

Fourth Embodiment

Figure 18:
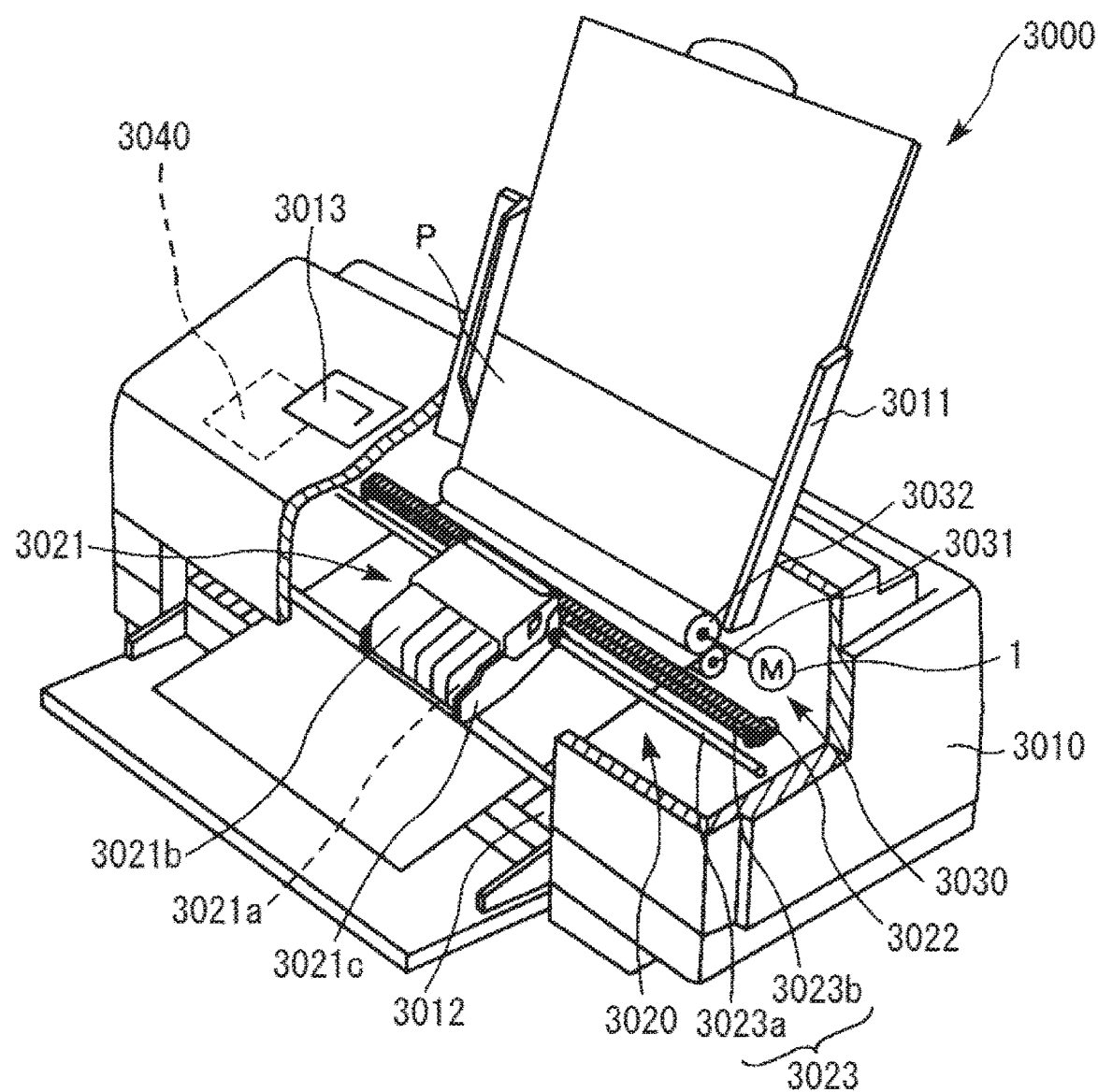
FIG. 18 is a schematic diagram showing an overall configuration of a printer according to a fourth embodiment of the present disclosure.

FIG. 18 is a schematic diagram showing an overall configuration of a printer according to a fourth embodiment of the present disclosure.

The printer 3000 shown in FIG. 18 is provided with a device main body 3010, a printing mechanism 3020, a paper-feeding mechanism 3030, and a control device 3040, wherein the printing mechanism 3020, the paper-feeding mechanism 3030 and the control device 3040 are disposed inside the device main body 3010. Further, the device main body 3010 is provided with a tray 3011 for installing recording sheets P, a paper ejection port 3012 for ejecting the recording sheets P, and an operation panel 3013 such as a liquid crystal display.

The printing mechanism 3020 is provided with a head unit 3021, a carriage motor 3022, and a reciprocating mechanism 3023 for reciprocating the head unit 3021 due to the drive force of the carriage motor 3022. Further, the head unit 3021 is provided with a head 3021a as an inkjet recording head, an ink cartridge 3021b for supplying the head 3021a with ink, and a carriage 3021c on which the head 3021a and the ink cartridge 3021b are mounted.

The reciprocating mechanism 3023 is provided with a carriage guide shaft 3023a supporting the carriage 3021c so as to be able to reciprocate, and a timing belt 3023b for moving the carriage 3021c on the carriage guide shaft 3023a due to the drive force of the carriage motor 3022. Further, the paper-feeding mechanism 3030 has a driven roller 3031 and a drive roller 3032 having pressure contact with each other, and the piezoelectric motor 1 for driving the drive roller 3032.

In such a printer 3000, the paper-feeding mechanism 3030 intermittently feeds the recording sheet P to the vicinity of a lower part of the head unit 3021 one by one. On this occasion, the head unit 3021 reciprocates in a direction roughly perpendicular to the feeding direction of the recording sheet P to perform printing on the recording sheet P.

The control device 3040 is formed of a computer, and has, for example, a processor (CPU), a memory and an I/F (interface). Further, the processor executes a predetermined program (a code string) stored in the memory to thereby control the drive of each section of the printer 3000. Such control is performed based on print data input from, for example, a host computer such as a personal computer via the I/F. It should be noted that the program described above can also be downloaded from an external server via the I/F. Further, it is also possible to adopt a configuration in which some or all of the constituents of the control device 3040 are disposed outside the printer 3000, and are connected via a communication network such as a local area network (LAN).

Such a printer 3000 is provided with the piezoelectric motor 1 as described above. Specifically, the printer 3000 is provided with the piezoelectric drive device 3 which is provided with the vibrating body 41 and the protruding part 44 coupled to the vibrating body 41, and vibrates the vibrating body 41 to make the tip of the protruding part 44 make the rotational motion of drawing an elliptic orbit to thereby drive the rotor 2 as a driven member having contact with the protruding part 44. Further, the vibrating body 41 is provided with the substrate 61, the piezoelectric elements 6A through 6E as the driving piezoelectric elements for vibrating the substrate 61, and the piezoelectric elements 6F, 6G as the detecting piezoelectric elements for detecting the vibration of the substrate 61. Further, the driving piezoelectric elements are provided with the piezoelectric element 6C as the first driving piezoelectric element for making the vibrating body 41 perform the stretching vibration in the Y-axis direction as the first direction in which the vibrating body 41 and the protruding part 44 are arranged side by side, and the piezoelectric elements 6A, 6B, 6D and 6E as the second driving piezoelectric elements for flexurally vibrating the vibrating body 41 in the Z-axis direction as the second direction perpendicular to the Y-axis direction in the plan view of the substrate 61, and the piezoelectric elements 6F, 6G are arranged with the piezoelectric element 6C side by side in the Y-axis direction. Further, the piezoelectric drive device 3 is provided with the voltage control section for controlling the magnitude (the amplitude) of the alternating voltage V2 as a voltage to be applied to the piezoelectric element 6C based on the pickup voltage Vpu as the signal output from the piezoelectric elements 6F, 6G. Then, the voltage control section 70 controls the magnitude (the amplitude) of the alternating voltage V2 to be applied to the piezoelectric element 6C so that the variation in the swing in the Y-axis direction of the protruding part 44 becomes smaller compared to the case in which the alternating voltage V2 to be applied to the piezoelectric element 6C is not controlled, namely the case in which the amplitude is constant. According to such a piezoelectric drive device 3, since the amplitude of the alternating voltage V2 is controlled so that the pickup voltage Vpu becomes the target value by feeding back the pickup voltage Vpu, it is possible to suppress the variation of the separation distance D compared to the case in which such control is not performed. Therefore, the printer 3000 capable of the stable drive is obtained.

It should be noted that the piezoelectric motor 1 drives the drive roller 3032 for paper-feeding in the present embodiment, but can also drive, for example, the carriage 3021c besides the drive roller 3032.

Although the piezoelectric drive device, the robot, and the printer according to the present disclosure are described hereinabove based on the illustrated embodiments, the present disclosure is not limited to these embodiments, but the configuration of each of the constituents can be replaced with one having an identical function and an arbitrary configuration. Further, it is also possible to add any other constituents to the present disclosure. Further, it is also possible to arbitrarily combine any of the embodiments with each other.

What is claimed is:

1. A piezoelectric drive device comprising:
 a vibrating body;
 a protruding part coupled to the vibrating body; and
 a voltage control section, wherein
 the piezoelectric drive device vibrates the vibrating body to make a tip of the protruding part make a rotational motion of drawing an elliptic orbit to thereby drive a driven member having contact with the protruding part,
 the vibrating body includes a substrate,
a driving piezoelectric element configured to vibrate the substrate, and
a detecting piezoelectric element configured to detect a vibration of the substrate,
the driving piezoelectric element includes
a first driving piezoelectric element configured to make the vibrating body perform a stretching vibration in a first direction in which the vibrating body and the protruding part are arranged, and
a second driving piezoelectric element configured to make the vibrating body perform a flexural vibration in a second direction perpendicular to the first direction in a plan view of the substrate,
the detecting piezoelectric element is arranged with the first driving piezoelectric element in the first direction, and
the voltage control section controls a magnitude of a voltage to be applied to the first driving piezoelectric element based on a signal output from the detecting piezoelectric element so that a variation in a swing in the first direction of the protruding part becomes smaller compared to a case in which the magnitude of the voltage to be applied to the first driving piezoelectric element is not controlled.

2. The piezoelectric drive device according to claim 1, wherein
the smaller the signal output from the detecting piezoelectric element is, the higher the voltage control section makes the voltage to be applied to the first driving piezoelectric element.

3. The piezoelectric drive device according to claim 1, further comprising:
a biasing member configured to bias the vibrating body toward the driven member in the first direction.

4. The piezoelectric drive device according to claim 1, wherein
the voltage control section controls a voltage to be applied to the second driving piezoelectric element based on a drive speed of the driven member.

5. The piezoelectric drive device according to claim 1, wherein
the detecting piezoelectric element is disposed in a part including a node of the flexural vibration of the substrate.

6. The piezoelectric drive device according to claim 1, wherein
the voltage control section continues an application of the voltage to the first driving piezoelectric element when switching a direction of the rotational motion of the protruding part to an opposite direction.

7. The piezoelectric drive device according to claim 1, wherein
the voltage control section starts an application of the voltage to the first driving piezoelectric element, and then starts an application of a voltage to the second piezoelectric element when starting the rotational motion of the protruding part.

8. A robot comprising:
a piezoelectric drive device including
a vibrating body,
a protruding part coupled to the vibrating body, and
a voltage control section, wherein
the piezoelectric drive device vibrates the vibrating body to make a tip of the protruding part make a rotational motion of drawing an elliptic orbit to thereby drive a driven member having contact with the protruding part,
the vibrating body includes
a substrate,
a driving piezoelectric element configured to vibrate the substrate, and
a detecting piezoelectric element configured to detect a vibration of the substrate,
the driving piezoelectric element includes
a first driving piezoelectric element configured to make the vibrating body perform a stretching vibration in a first direction in which the vibrating body and the protruding part are arranged, and
a second driving piezoelectric element configured to make the vibrating body perform a flexural vibration in a second direction perpendicular to the first direction in a plan view of the substrate,
the detecting piezoelectric element is arranged with the first driving piezoelectric element in the first direction, and
the voltage control section controls a magnitude of a voltage to be applied to the first driving piezoelectric element based on a signal output from the detecting piezoelectric element so that a variation in a swing in the first direction of the protruding part becomes smaller compared to a case in which the magnitude of the voltage to be applied to the first driving piezoelectric element is not controlled.

9. A printer comprising:
a piezoelectric drive device including
a vibrating body,
a protruding part coupled to the vibrating body, and
a voltage control section, wherein
the piezoelectric drive device vibrates the vibrating body to make a tip of the protruding part make a rotational motion of drawing an elliptic orbit to thereby drive a driven member having contact with the protruding part,
the vibrating body includes
a substrate,
a driving piezoelectric element configured to vibrate the substrate, and
a detecting piezoelectric element configured to detect a vibration of the substrate,
the driving piezoelectric element includes
a first driving piezoelectric element configured to make the vibrating body perform a stretching vibration in a first direction in which the vibrating body and the protruding part are arranged, and
a second driving piezoelectric element configured to make the vibrating body perform a flexural vibration in a second direction perpendicular to the first direction in a plan view of the substrate,
the detecting piezoelectric element is arranged with the first driving piezoelectric element in the first direction, and
the voltage control section controls a magnitude of a voltage to be applied to the first driving piezoelectric element based on a signal output from the detecting piezoelectric element so that a variation in a swing in the first direction of the protruding part becomes smaller compared to a case in which the magnitude of the voltage to be applied to the first driving piezoelectric element is not controlled.

* * * * *